(12) United States Patent
Yoshimi

(10) Patent No.: US 8,599,494 B2
(45) Date of Patent: Dec. 3, 2013

(54) ZOOM LENS AND IMAGE PICKUP APPARATUS HAVING THE SAME

(75) Inventor: Takahiro Yoshimi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 117 days.

(21) Appl. No.: 13/396,510

(22) Filed: Feb. 14, 2012

(65) Prior Publication Data

US 2012/0218645 A1 Aug. 30, 2012

(30) Foreign Application Priority Data

Feb. 28, 2011 (JP) ................................. 2011-042075

(51) Int. Cl.
*G02B 15/14* (2006.01)

(52) U.S. Cl.
USPC .......................................... 359/687; 359/688

(58) Field of Classification Search
USPC ................................. 359/687, 688
See application file for complete search history.

(56) References Cited

U.S. PATENT DOCUMENTS

| 6,956,704 | B2 | 10/2005 | Oomura et al. |
| 6,987,622 | B2 * | 1/2006 | Nurishi ......................... 359/684 |
| 7,583,449 | B2 | 9/2009 | Kusaka |
| 7,903,345 | B2 | 3/2011 | Nurishi |

FOREIGN PATENT DOCUMENTS

| JP | 2004264457 A | 9/2004 |
| JP | 2008197533 A | 8/2008 |
| JP | 2010091788 A | 4/2010 |

\* cited by examiner

*Primary Examiner* — William Choi
(74) *Attorney, Agent, or Firm* — Canon USA Inc. IP Division

(57) ABSTRACT

A zoom lens includes a first lens unit with positive refraction that is stationary for zooming, a second unit with negative refraction that moves during zooming, a third unit that moves on the optical axis along with movement of the second unit, and a fourth unit with positive refraction that is stationary during zooming, arranged in order from the object to image planes. The first unit includes a negative meniscus element G1 convex towards the object plane, a positive element G2, a positive element G3, and a positive meniscus element G5 convex towards the object plane, arranged in order from the object to image planes. The respective curvature radii G1R1, G1R2, G5R1, and G5R2 of surfaces of the elements G1 and G5 and the respective focal lengths fG1, fG2, and f1 of the elements G1 and G5 and the first unit are set appropriately.

9 Claims, 13 Drawing Sheets

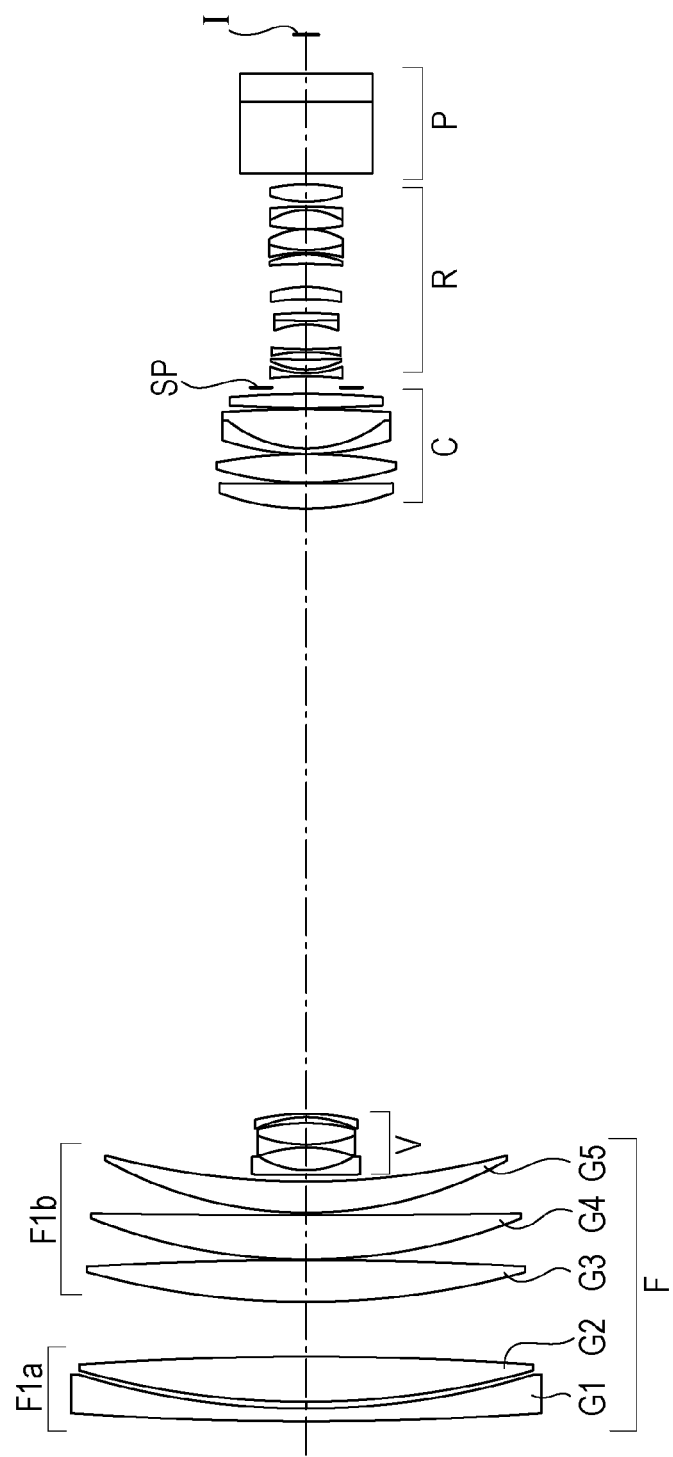

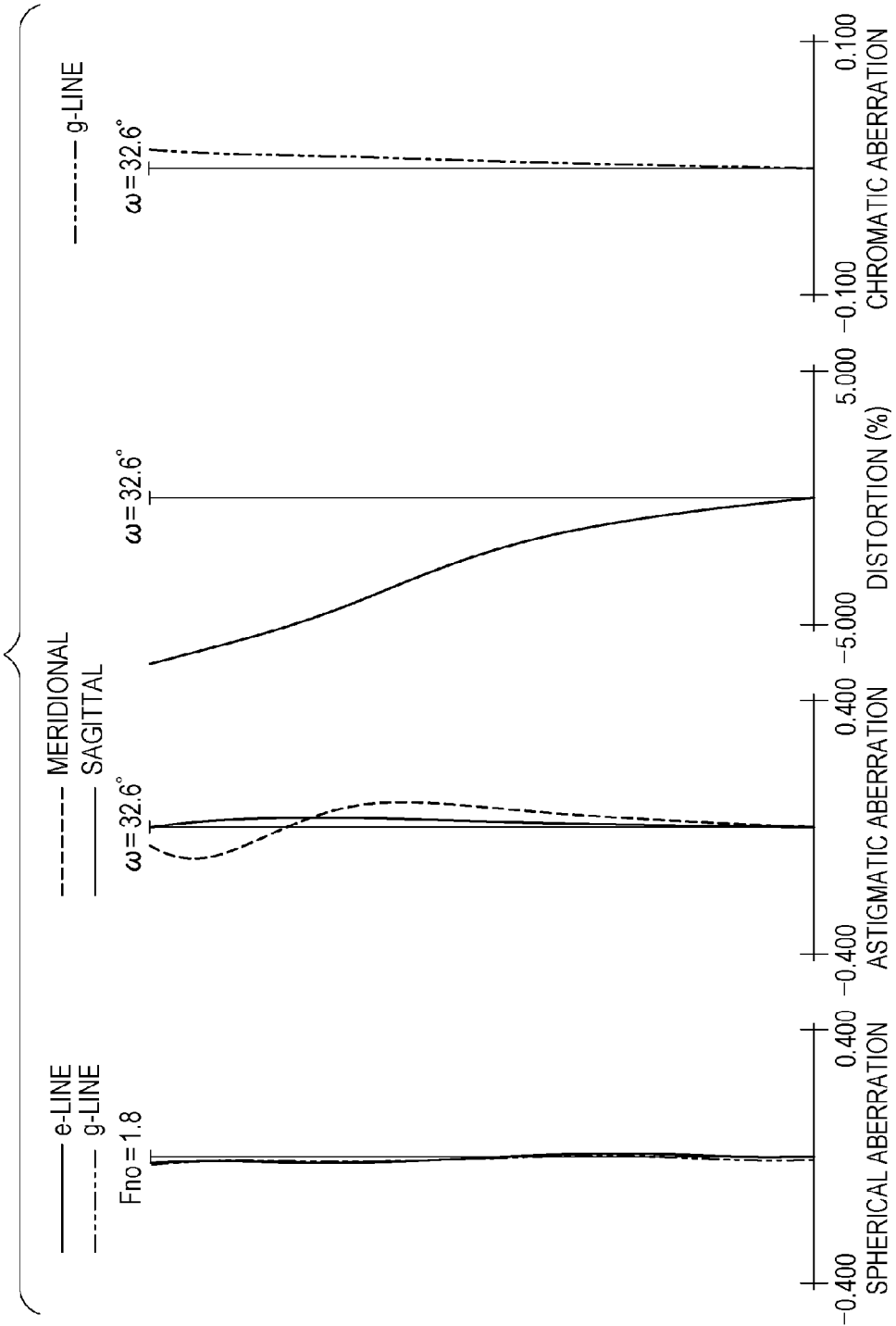

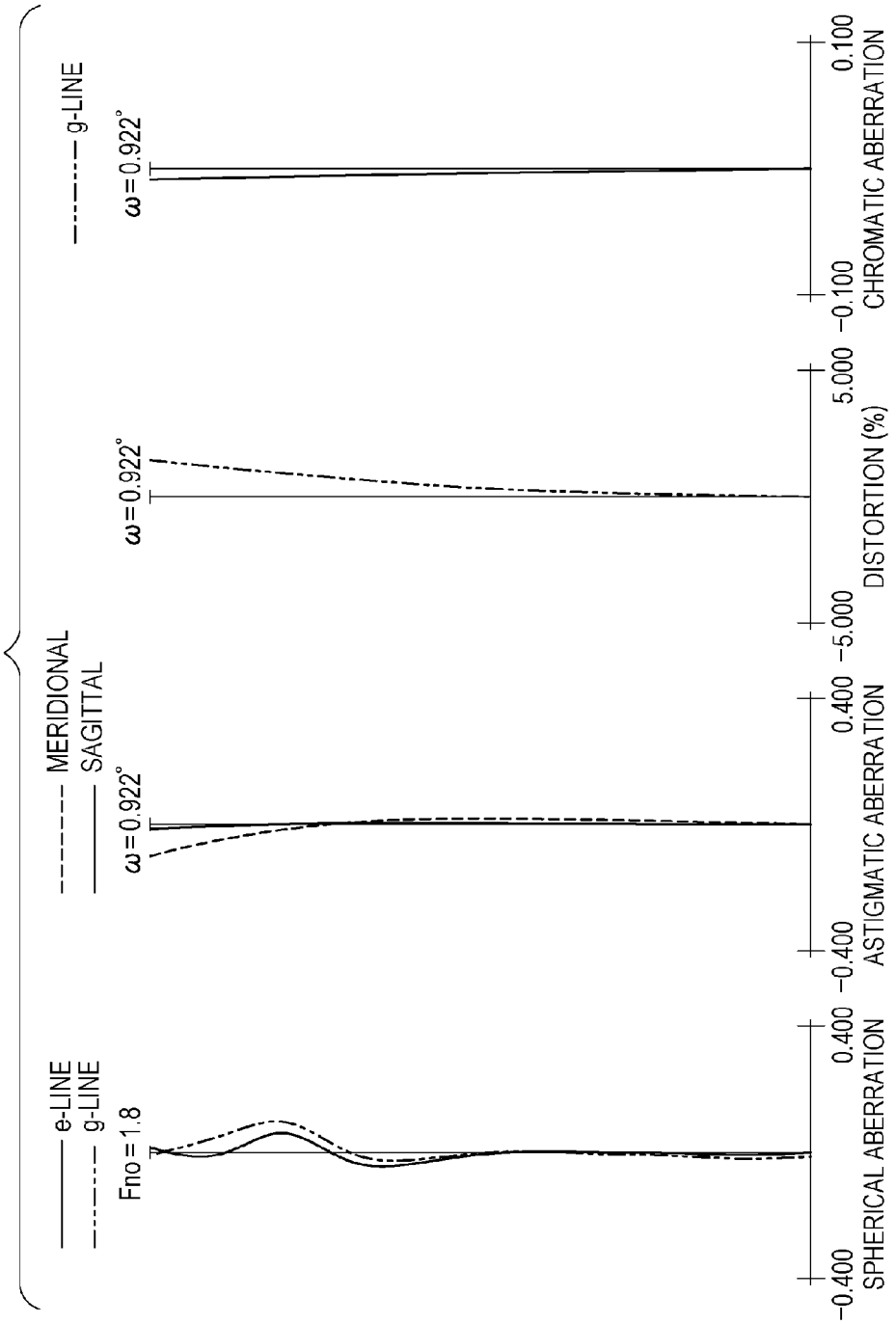

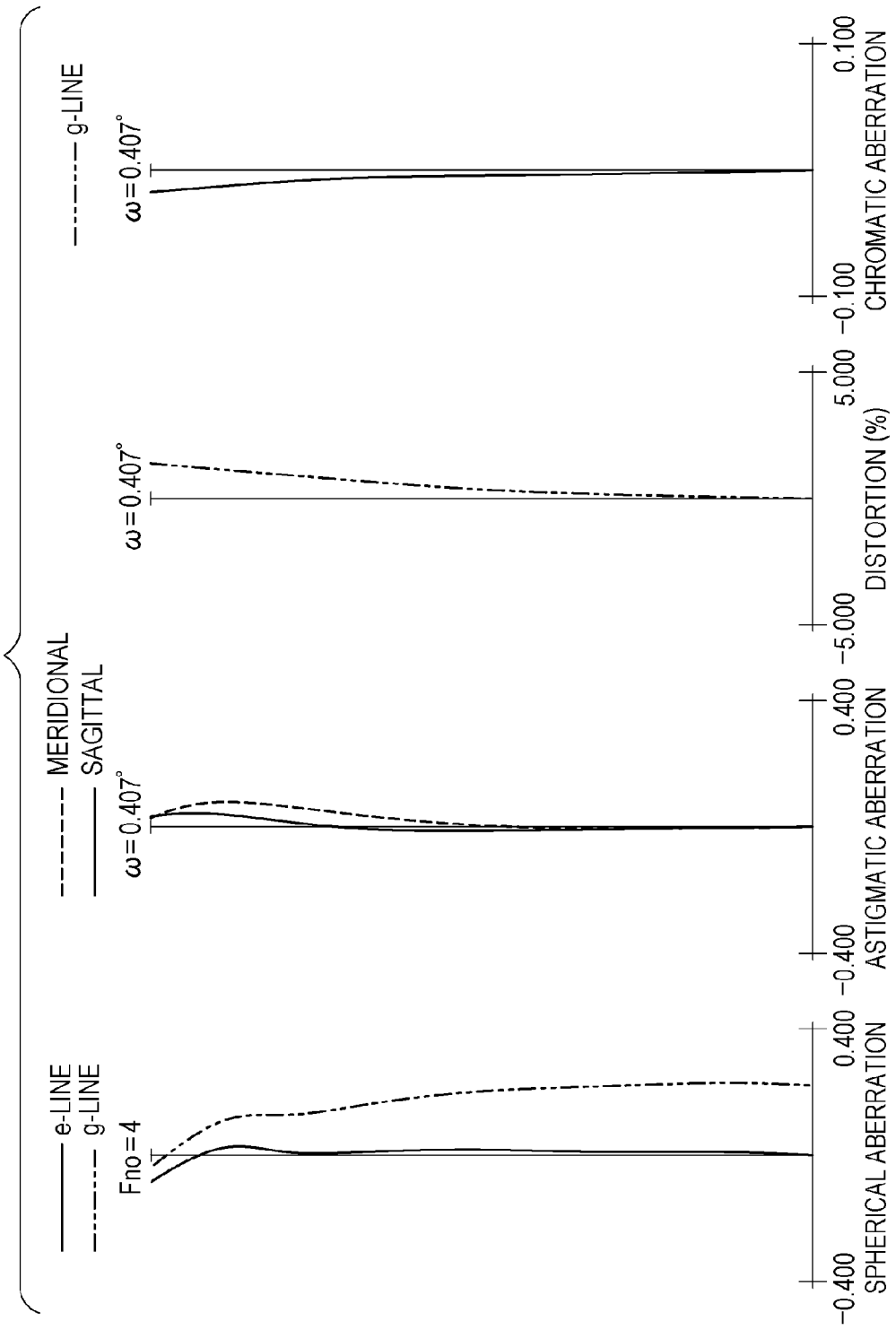

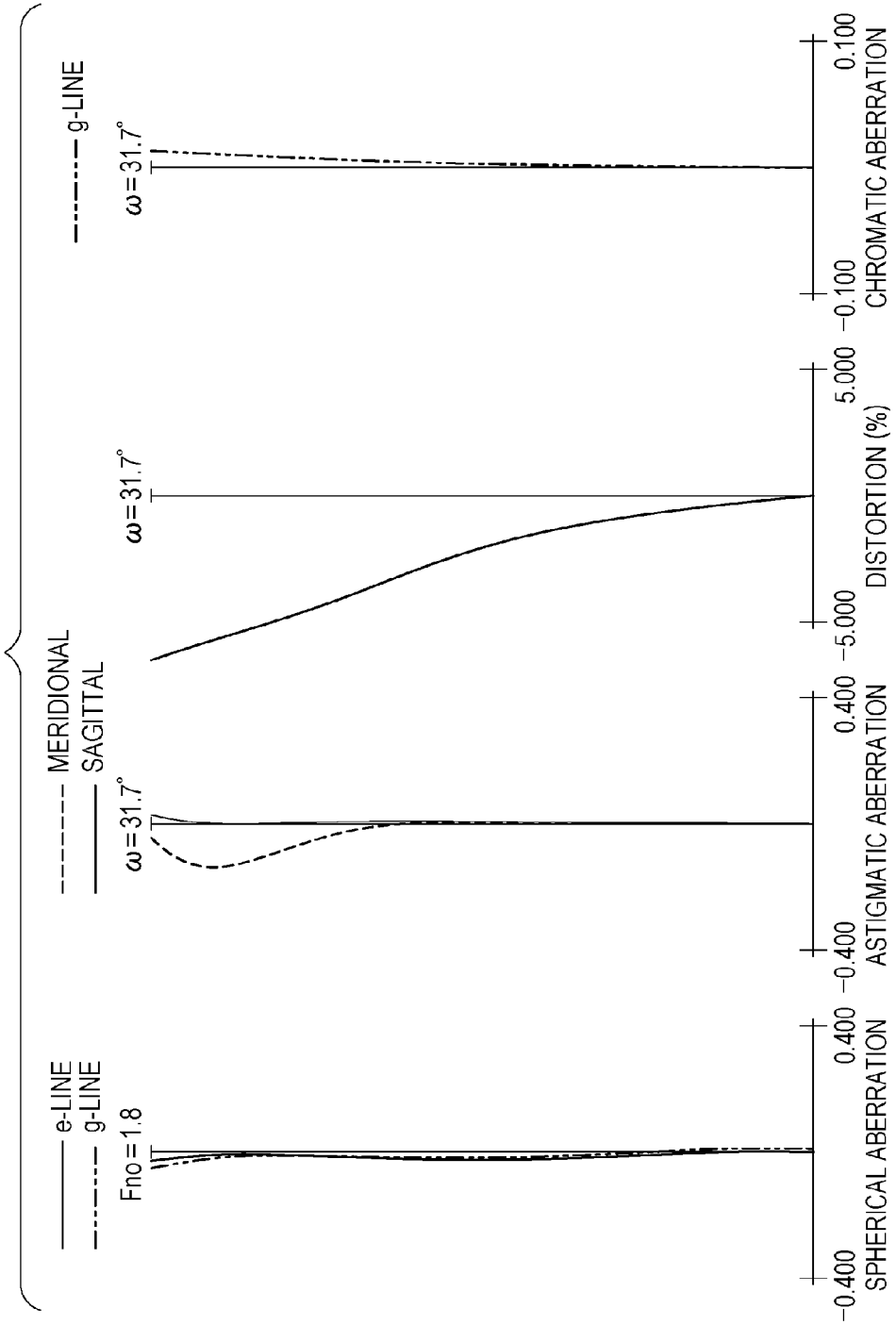

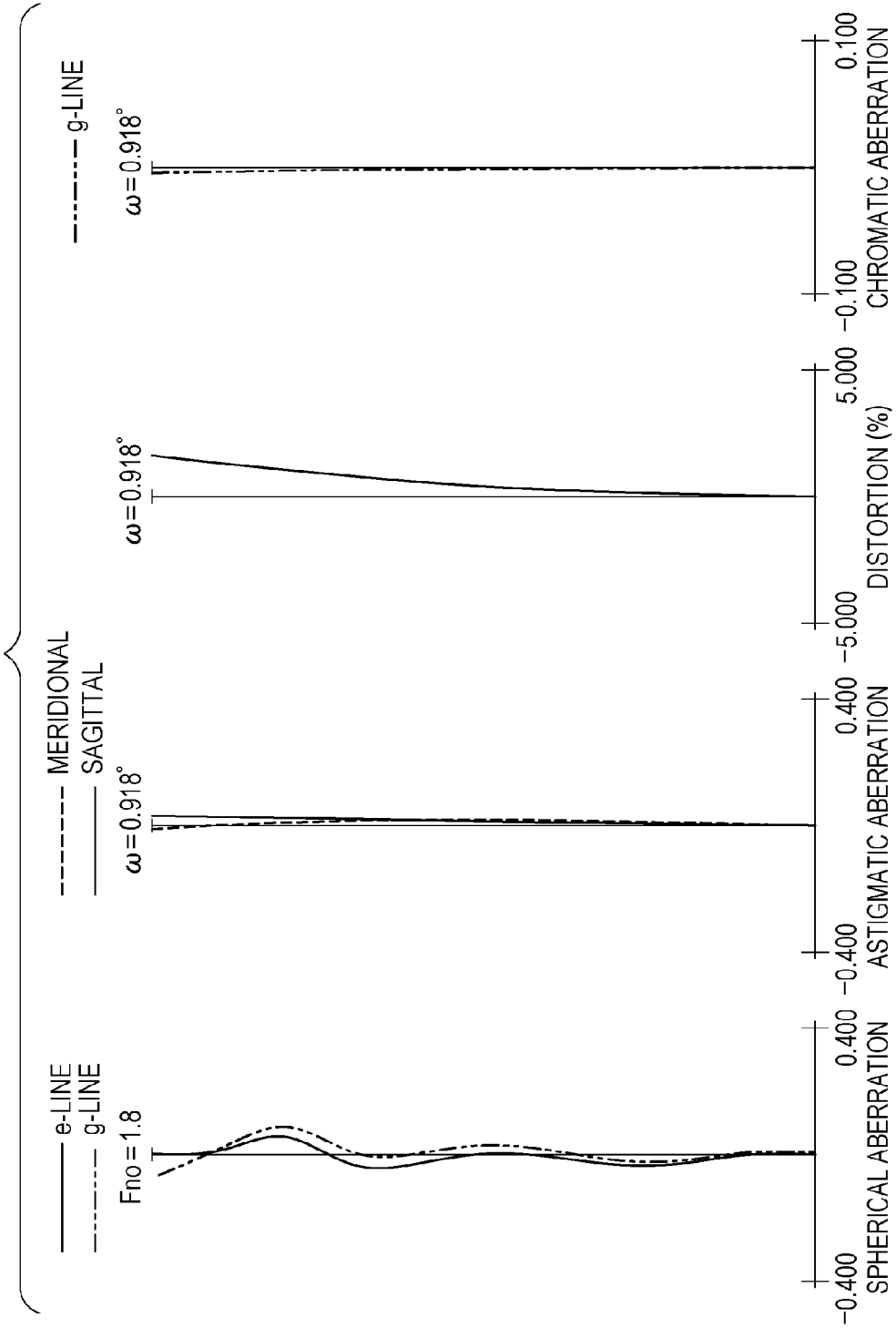

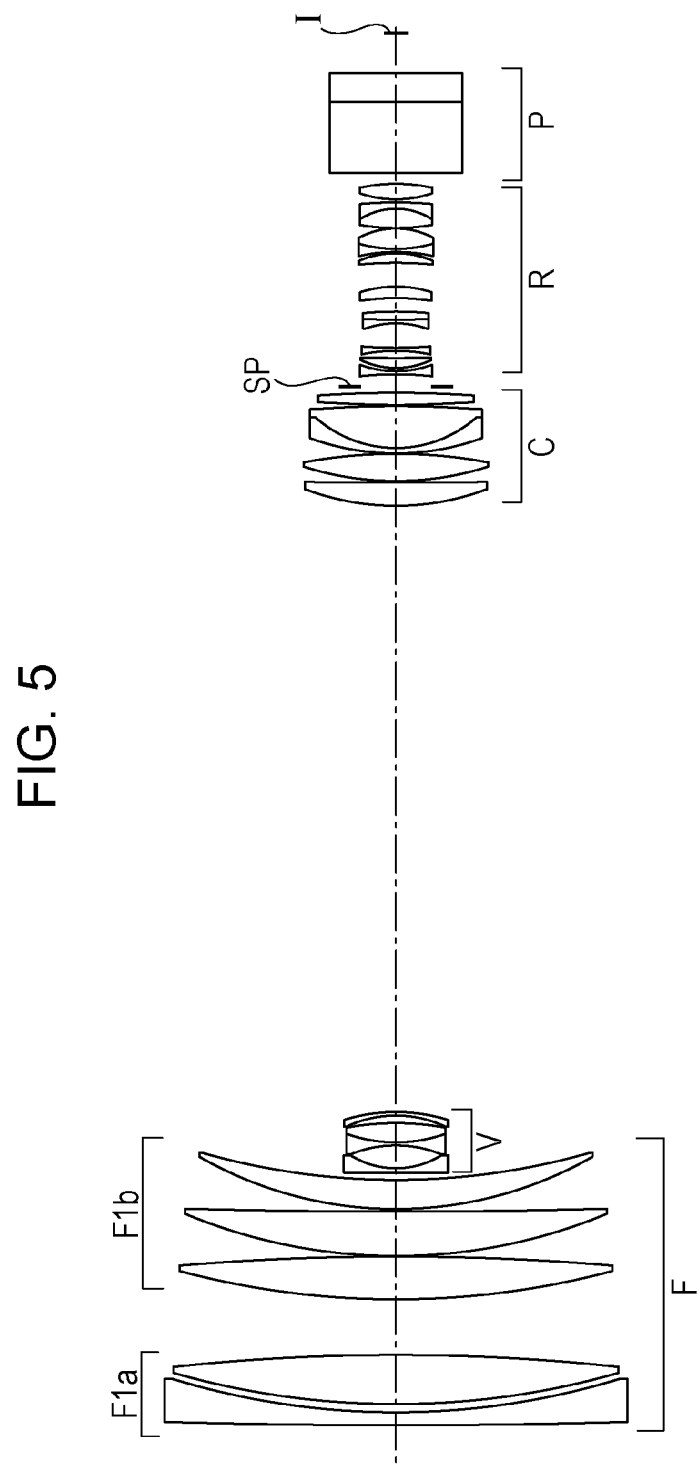

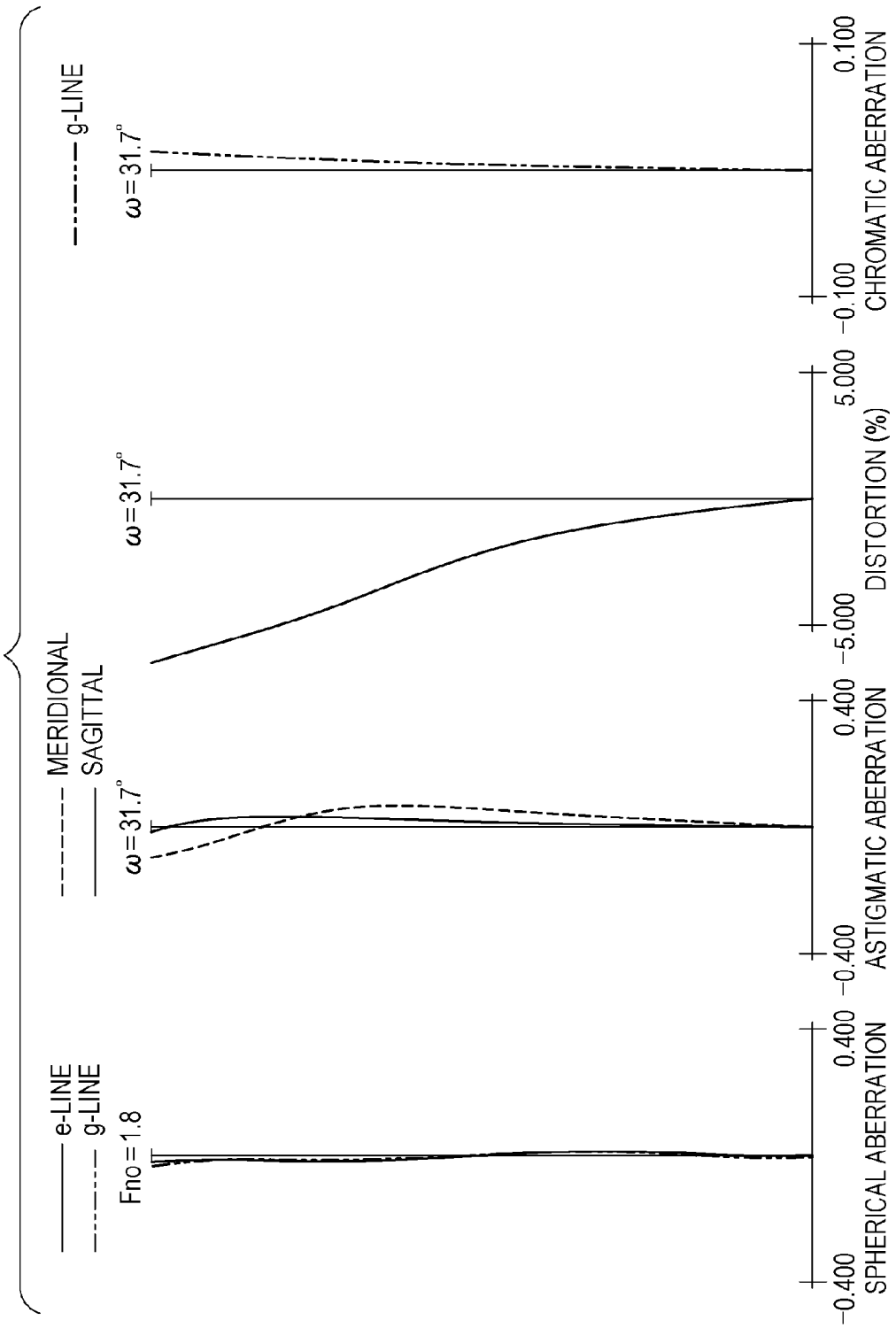

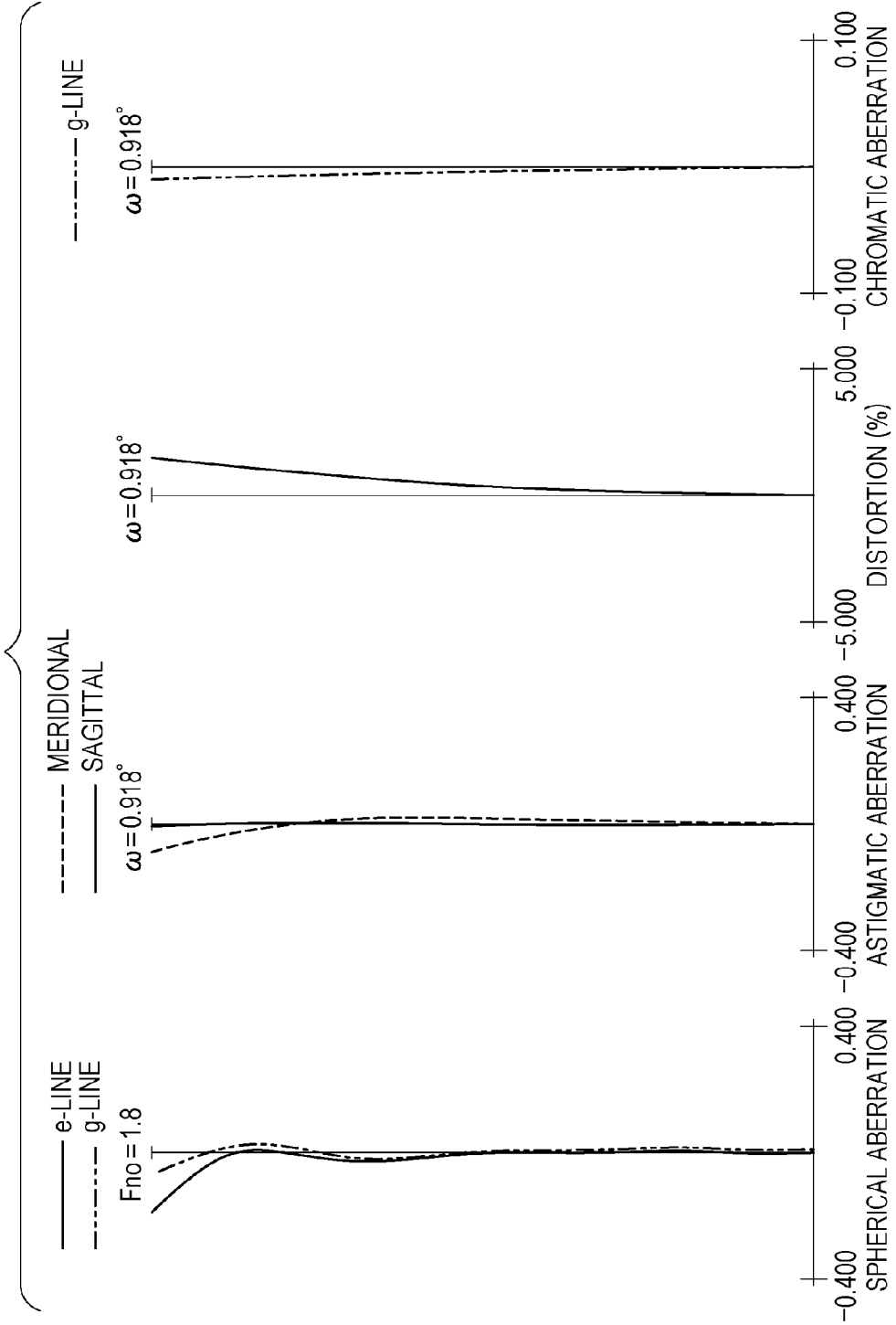

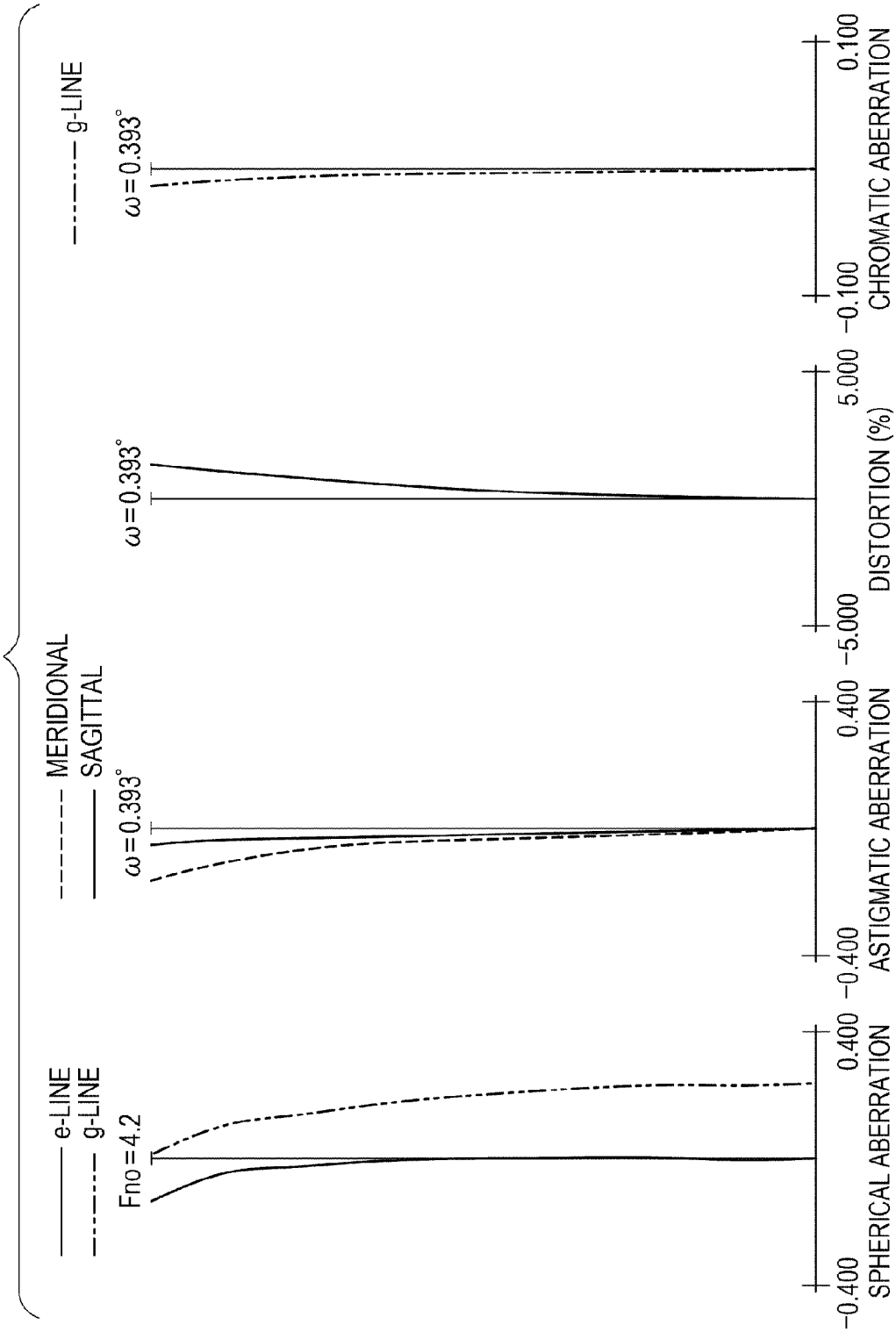

ZOOM LENS AND IMAGE PICKUP APPARATUS HAVING THE SAME

BACKGROUND OF THE INVENTION

1. Field of the Invention

The present invention relates to a zoom lens and an image pickup apparatus having the zoom lens. The zoom lens may be suitable for application to television cameras for broadcasting, video cameras, digital still cameras, and cameras for silver-halide photography, among others.

2. Description of the Related Art

A zoom lens with a high zoom ratio and high optical performance is desired for image pickup apparatuses such as television cameras, cameras for silver-halide films, digital cameras, and video cameras. As a zoom lens with a high zoom ratio, there is known a positive-lead telephoto zoom lens including four lens units as a whole in which a lens unit disposed closest to the object has a positive refractive power. For example, there is known a zoom lens with four lens units including a first lens unit with a positive refractive power for focusing, a second lens unit with a negative refractive power for magnification variation, a third lens unit with a positive refractive power for correction of image plane variation, and a fourth lens unit with a positive refractive power for image formation. There have been proposed zoom lenses with four lens units that achieve a wide field angle and a high zoom ratio (U.S. Pat. No. 6,956,704, U.S. Pat. No. 7,583,449, and U.S. Pat. No. 7,903,345).

U.S. Pat. No. 6,956,704 discloses a zoom lens with a photographing field angle at the wide-angle end of 60.93° and a zoom factor of about 96. U.S. Pat. No. 7,583,449 discloses a zoom lens with a photographing field angle at the wide-angle end of 69.02° and a zoom factor of about 106. U.S. Pat. No. 7,903,345 discloses a zoom lens with a photographing field angle at the wide-angle end of 62.86° and a zoom factor of about 120.

Image pickup apparatuses such as television cameras, cameras for photography, and video cameras are preferable when their entire system is made small in size and light in weight, in addition to having high optical performance. Accordingly, it is highly desirable that a zoom lens with a high zoom ratio and wide field angle also be made compact and light weight. In a zoom lens with a high zoom ratio, the size and weight of the lens unit on the object side significantly affects the operability of the camera lens. Therefore, it is becoming particularly important to reduce the size and weight of the lens unit on the object side.

In order to achieve a high zoom ratio, in general, it is necessary to secure a long movable range for the lens unit for magnification variation, which tends to increase the effective lens diameter of the first lens unit disposed closest to the object. In order to achieve a wide field angle, meanwhile, it is necessary to secure a wide angle of incidence of a ray taken into the lens system, which also tends to increase the effective lens diameter of the first lens unit. In order to suppress an increase in effective lens diameter of the first lens unit while increasing the field angle and the zoom ratio at the same time, it is effective to reduce the number of lens elements forming the first lens unit and move the rear principal point of the first lens unit toward the image plane.

In order to increase the field angle and the zoom ratio while reducing the size of the entire system of the zoom lens with four lens units discussed above, in particular, it is important to appropriately set the lens configuration of the first lens unit which does not move for zooming.

If the lens configuration of the first lens unit is inappropriate, it is difficult to obtain a zoom lens with a wide field angle and a high zoom ratio while reducing the size of the entire system.

SUMMARY OF THE INVENTION

The present invention provides a zoom lens including: a first lens unit with a positive refractive power that does not move for zooming; a second lens unit with a negative refractive power that moves during zooming; a third lens unit that moves during zooming; and a fourth lens unit with a positive refractive power that does not move for zooming, the lens units being arranged in this order from a side of an object to a side of an image, in which the first lens unit includes a negative lens element G1 having a meniscus shape with a convex surface facing toward the object, a positive lens element G2, a positive lens element G3, and a positive lens element G5 having a meniscus shape with a convex surface facing toward the object, the lens elements being arranged in this order from the object side to the image side, and when radii of curvature of object-side and image-side lens surfaces of the negative lens element G1 are defined as G1R1 and G1R2, respectively, a focal length of the negative lens element G1 is defined as fG1, radii of curvature of object-side and image-side lens surfaces of the positive lens element G5 are defined as G5R1 and G5R2, respectively, a focal length of the positive lens element G5 is defined as fG5, and a focal length of the first lens unit is defined as f1, then the following conditional expressions are satisfied:

$$-2.2 < fG1/f1 < -1.5$$

$$1.0 < (G1R1+G1R2)/(G1R1-G1R2) < 2.0$$

$$2.4 < fG5/f1 < 3.7$$

$$-4.0 < (G5R1+G5R2)/(G5R1-G5R2) < -3.0$$

The present invention provides an image pickup apparatus including: a zoom lens; and an image pickup element that receives light for an image formed by the zoom lens, in which the zoom lens includes a first lens unit with a positive refractive power that does not move for zooming, a second lens unit with a negative refractive power that moves during zooming, a third lens unit that moves during zooming, and a fourth lens unit with a positive refractive power that does not move for zooming, the lens units being arranged in this order from a side of an object to a side of the image pickup element; the first lens unit includes a negative lens element G1 having a meniscus shape with a convex surface facing toward the object, a positive lens element G2, a positive lens element G3, and a positive lens element G5 having a meniscus shape with a convex surface facing toward the object, the lens elements being arranged in this order from the object side to the image pickup element side; and when radii of curvature of object-side and image pickup element-side lens surfaces of the negative lens element G1 are defined as G1R1 and G1R2, respectively, a focal length of the negative lens element G1 is defined as fG1, radii of curvature of object-side and image pickup element-side lens surfaces of the positive lens element G5 are defined as G5R1 and G5R2, respectively, a focal length of the positive lens element G5 is defined as fG5, and a focal length of the first lens unit is defined as f1, then the following conditional expressions are satisfied:

$$-2.2 < fG1/f1 < -1.5$$

$$1.0 < (G1R1+G1R2)/(G1R1-G1R2) < 2.0$$

$2.4 < fG5/f1 < 3.7$ $-4.0 < (G5R1+G5R2)/(G5R1-G5R2) < -3.0$

Further features of the present invention will become apparent from the following description of exemplary embodiments with reference to the attached drawings.

BRIEF DESCRIPTION OF THE DRAWINGS

FIG. 1 is a cross-sectional view of a lens according to Numerical Example 1 at the wide-angle end.

FIGS. 2A, 2B, and 2C are charts showing aberrations of the lens according to Numerical Example 1 at the wide-angle end, an intermediate zooming position, and the telephoto end, respectively, with focus on an object at infinity.

FIGS. 4A, 4B, and 4C are charts showing aberrations of the lens according to Numerical Example 2 at the wide-angle end, an intermediate zooming position, and the telephoto end, respectively, with focus on an object at infinity.

FIG. 5 is a cross-sectional view of a lens according to Numerical Example 3 at the wide-angle end.

FIGS. 6A, 6B, and 6C are charts showing aberrations of the lens according to Numerical Example 3 at the wide-angle end, an intermediate zooming position, and the telephoto end, respectively, with focus on an object at infinity.

DESCRIPTION OF THE EMBODIMENTS

Figure 3:
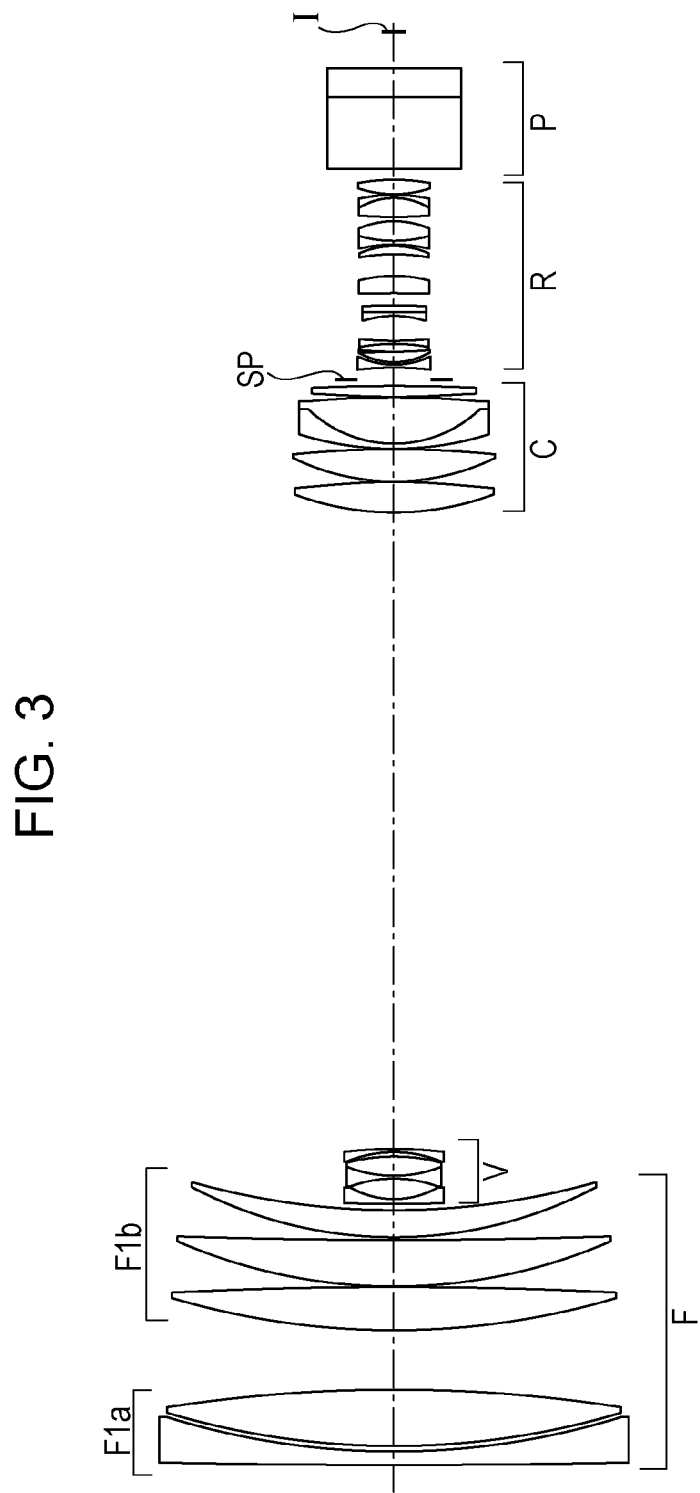
FIG. 3 is a cross-sectional view of a lens according to Numerical Example 2 at the wide-angle end.

The present invention provides a zoom lens that facilitates increasing the zoom ratio and the field angle and that facilitates reducing the size of the entire system. For purposes of the following description, a plane where an object to be imaged is located will be referred to as an "object plane", and a plane where an image of the object is formed will be referred to as an "image plane". When considering an entire image pickup apparatus that includes a zoom lens and an image pickup element, the image plane corresponds to a plane located at a surface of the image pickup element facing the zoom lens. Incidentally, the side of a lens where the object to be imaged is placed is referred to as the "object-plane side", "object side", or "front side" of the lens; and the side of the lens where the image is formed is referred to as the "image-plane side", "image side" or "back side" of the lens.

Preferred embodiments of the present invention will be described in detail below with reference to the accompanying drawings. First, a zoom lens according to the present invention will be described.

The zoom lens according to the present invention includes a first lens unit with a positive refractive power that does not move for zooming, and a second lens unit with a negative refractive power for magnification variation that moves during zooming, which are arranged in this order from the object side to the image side. The zoom lens according to the present invention further includes a third lens unit with a positive refractive power that moves on the optical axis in conjunction with movement of the second lens unit to correct image plane variation that occurs along with magnification variation, and a fourth lens unit with a positive refractive power that does not move for zooming.

The first lens unit is formed by an F1a lens sub-unit (first lens sub-unit) with a negative refractive power and an F1b lens sub-unit (second lens sub-unit) with a positive refractive power, with the longest air distance serving as the boundary therebetween. The F1a lens unit is formed by a negative lens element G1 having a meniscus shape with a convex surface facing toward the object side, and a positive lens element G2, which are arranged in this order from the object side to the image side. The F1b lens unit is formed by a positive lens element G3, a positive lens element G4, and a positive lens element G5 having a meniscus shape with a convex surface facing toward the object side, which are arranged in this order from the object side to the image side.

FIG. 1 is a cross-sectional view of a zoom lens according to Example 1 (Numerical Example 1) of the present invention at the wide-angle end (at the end with the shortest focal length of f=8.6 mm) with focus on an object at infinity. FIGS. 2A, 2B, and 2C are charts showing aberrations of the lens according to Numerical Example 1 at the wide-angle end, an intermediate zooming position (at a focal length of f=341.63 mm), and the telephoto end (at the end with the longest focal length of f=774.0 mm), respectively, with focus on an object at infinity. It should be noted that the focal length values in the numerical examples are represented in units of mm. This applies to all the examples to be described below.

Figure 4C:
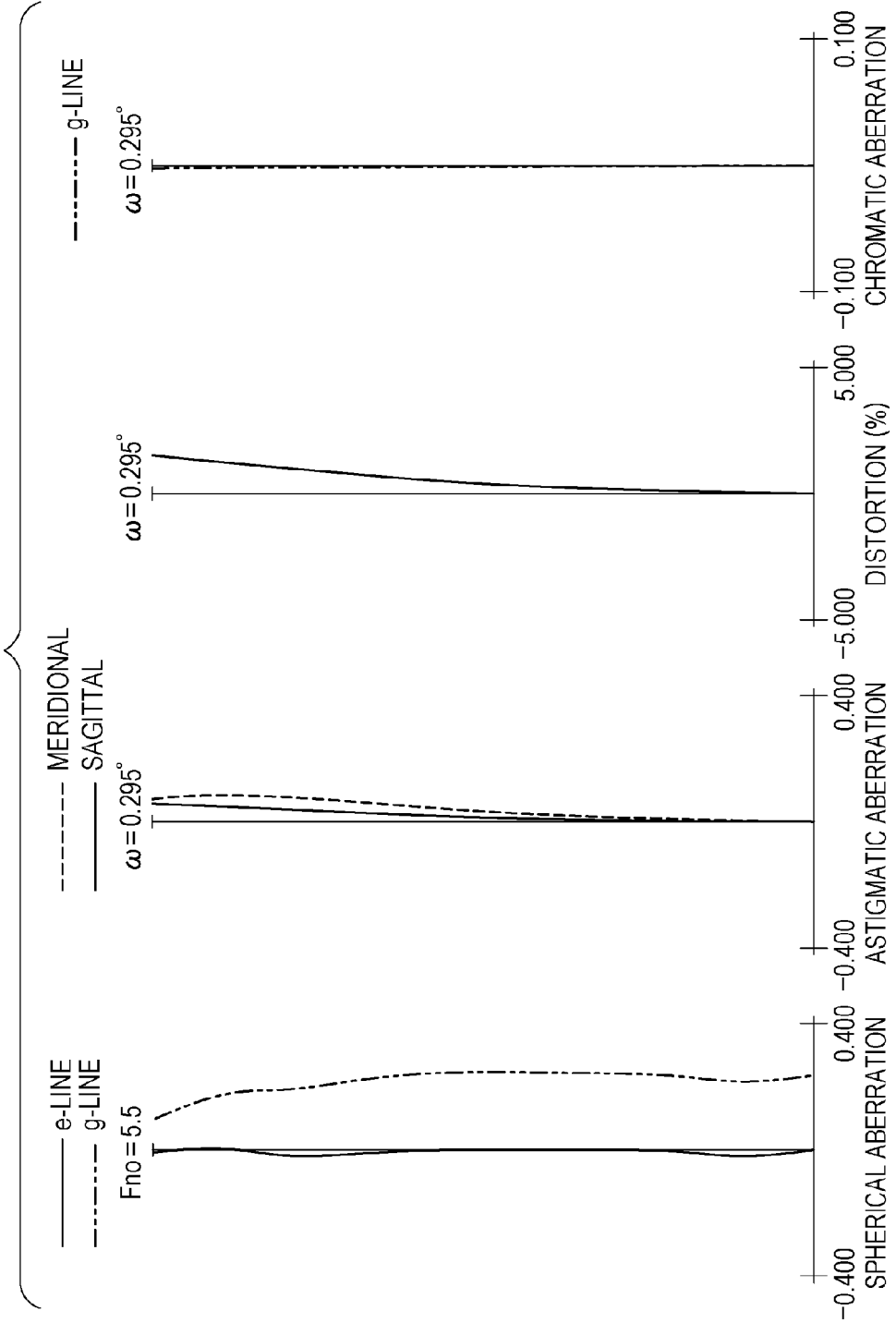

FIG. 3 is a cross-sectional view of a zoom lens according to Example 2 (Numerical Example 2) of the present invention at the wide-angle end (f=8.9 mm) with focus on an object at infinity. FIGS. 4A, 4B, and 4C are charts showing aberrations of the lens according to Numerical Example 2 at the wide-angle end, an intermediate zooming position (at a focal length of f=343.29 mm), and the telephoto end (at a focal length of f=1068.0 mm), respectively, with focus on an object at infinity.

FIG. 5 is a cross-sectional view of a zoom lens according to Example 3 (Numerical Example 3) of the present invention at the wide-angle end (f=8.9 mm) with focus on an object at infinity. FIGS. 6A, 6B, and 6C are charts showing aberrations of the lens according to Numerical Example 3 at the wide-angle end, an intermediate zooming position (at a focal length of f=343.29 mm), and the telephoto end (at a focal length of f=801.0 mm), respectively, with focus on an object at infinity.

Figure 7:
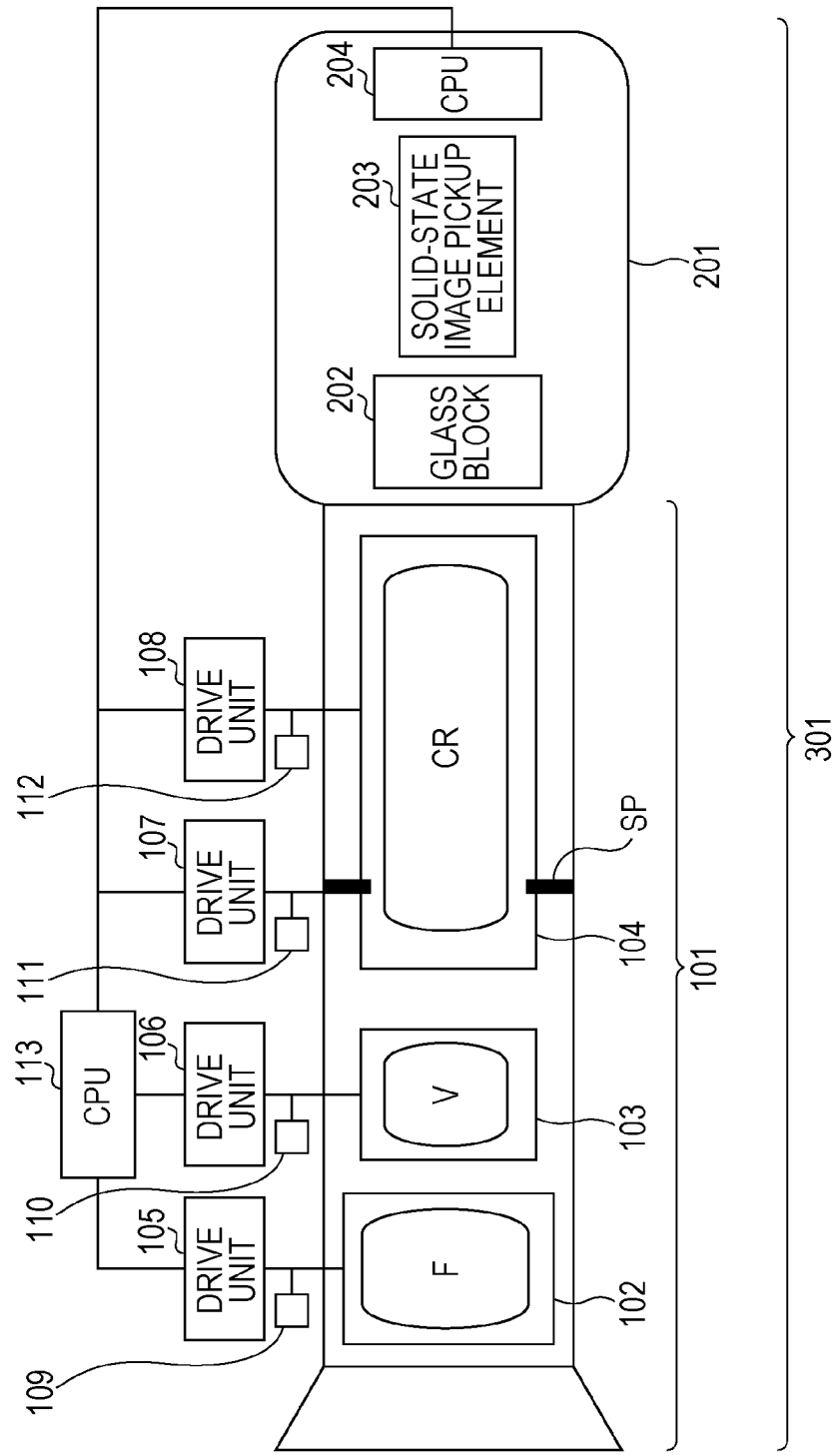
FIG. 7 is a schematic diagram of an image pickup apparatus according to the present invention.

FIG. 7 is a schematic diagram of an essential portion of an image pickup apparatus according to the present invention.

In the lens cross-sectional view according to each example, the left side corresponds to the object side, and the right side corresponds to the image side. In the lens cross-sectional view, "F" denotes a front lens unit with a positive refractive power serving as the first lens unit that does not move for magnification variation. "F1a" denotes the F1a lens unit F1a with a negative refractive power forming a part of the first lens unit F that is stationary during focusing. "F1b" denotes the F1b lens unit F1b with a positive refractive power forming a part of the first lens unit F that moves during focusing.

The F1b lens unit (second lens sub-unit) moves toward the object side when the target to be focused on is switched from an object at infinity to a near object. "V" denotes a variator with a negative refractive power serving as the second lens unit for magnification variation, which moves monotonously toward the image side on the optical axis to vary the magnification from the wide-angle end to the telephoto end. "C" denotes a compensator with a positive refractive power serving as the third lens unit, which moves non-linearly toward the object side on the optical axis to correct image plane variation that occurs along with magnification variation from the wide-angle end to the telephoto end. The variator V and the compensator C form a magnification variation system.

"SP" denotes a stop (aperture stop), which is disposed on the object side of the fourth lens unit R. "R" denotes a fixed relay lens unit with a positive refractive power and an image forming effect serving as the fourth lens unit. "P" denotes a color separation prism, an optical filter, or the like, and is illustrated as a glass block in the drawings. "I" denotes an image pickup plane, which corresponds to an image pickup plane of a solid-state image pickup element (photoelectric conversion element) that receives an image formed by the zoom lens to perform photoelectric conversion. In other words, the image plane corresponds to a plane located at a surface of the image pickup element facing the zoom lens.

In the aberration charts, the solid line and the double-dashed line in the spherical aberration correspond to the Fraunhofer e-line and g-line, respectively. The dotted line and the solid line in the astigmatic aberration correspond to meridional image plane and sagittal image plane, respectively. The lateral chromatic aberration is represented by g-line. "ω" represents half-field angle, and Fno represents F number. The spherical aberration and the astigmatic aberration are drawn to a scale of 0.4 mm. The distortion is drawn to a scale of 5%. The lateral chromatic aberration is drawn to a scale of 0.1 mm.

In the description of each example below, the wide-angle end and the telephoto end correspond to zooming positions at which the lens unit for magnification variation (second lens unit V) is positioned at one of both ends of its movable range on the optical axis.

In each example, the radii of curvature of the object-side and image-side lens surfaces of the negative lens element G1 forming the first lens unit F are defined as G1R1 and G1R2, respectively.

The focal length of the negative lens element G1 is defined as fG1.

The radii of curvature of the object-side and image-side lens surfaces of the positive lens element G5 are defined as G5R1 and G5R2, respectively.

The focal length of the positive lens element G5 is defined as fG5.

The focal length of the first lens unit is defined as f1.

Then, the following conditional expressions are satisfied:

$$-2.2 < fG1/f1 < -1.5 \quad (1)$$

$$1.0 < (G1R1+G1R2)/(G1R1-G1R2) < 2.0 \quad (2)$$

$$2.4 < fG5/f1 < 3.7 \quad (3)$$

$$-4.0 < (G5R1+G5R2)/(G5R1-G5R2) < -3.0 \quad (4)$$

The conditional expression (1) specifies the ratio between the focal length of the negative lens element G1 forming the first lens unit F and the focal length of the first lens unit F forming the zoom lens according to each example. If the focal length of the negative lens element G1 is so long that the lower limit value of the conditional expression (1) is exceeded, the rear principal point of the first lens unit F may not be moved toward the image side sufficiently, which makes it difficult to reduce the diameter of the first lens unit F. If the focal length of the negative lens element G1 is so short that the upper limit value of the conditional expression (1) is exceeded, conversely, it is easy to reduce the diameter of the first lens unit F, but it is difficult to correct the spherical aberration at the telephoto end, and to correct the off-axis aberration at the wide-angle end.

The conditional expression (2) specifies the shape of the negative lens element G1 in a negative meniscus shape forming the first lens unit F. If the lower limit value of the conditional expression (2) is exceeded so that the lens has a biconcave shape, it is difficult to reduce the diameter of the first lens unit F by moving the rear principal point of the first lens unit F toward the image side. This is because an off-axis ray is incident on the object-side lens surface at a position on the object side with respect to the surface vertex of the negative lens element G1 at the wide-angle end, which may provide a counteraction to increase the diameter of the first lens unit F.

In addition, the power of the image-side lens surface is relatively reduced. This makes it difficult to suppress distortion that occurs when zooming is performed particularly from the wide-angle end to a zooming position at a focal length defined by fwm=fw×$Z^{1/4}$ (fw: focal length at the wide-angle end, z: zoom ratio) (hereinafter referred to as a "focal length fwm") and variation in off-axis aberration such as coma aberration. It is also difficult to correct the spherical aberration at the telephoto end. If the upper limit value of the conditional expression (2) is exceeded, it is difficult to move the rear principal point of the first lens unit F toward the image side sufficiently, which makes it difficult to reduce the diameter of the first lens unit F.

The conditional expression (3) specifies the ratio between the focal length of the positive lens element G5, which is the closest to the image, forming the first lens unit F and the focal length of the first lens unit F forming the zoom lens according to each example. If the upper limit value of the conditional expression (3) is exceeded, it is difficult to move the rear principal point of the first lens unit F toward the image side sufficiently, which makes it difficult to reduce the diameter of the first lens unit F. If the lower limit value of the conditional expression (3) is exceeded, it is easy to reduce the diameter of the first lens unit F, but it is difficult to suppress distortion that occurs when zooming is performed from the wide-angle end to a zooming position at a focal length of fwm and variation in off-axis aberration such as coma aberration. It is also difficult to correct the spherical aberration at the telephoto end.

The conditional expression (4) specifies the shape of the positive lens element G5 having a meniscus shape, which is the closest to the image, forming the first lens unit F. If the lower limit value of the conditional expression (4) is exceeded, it is difficult to suppress distortion that occurs when zooming is performed from the wide-angle end to a zooming position at a focal length of fwm and variation in off-axis aberration such as coma aberration. It is also difficult to correct the spherical aberration at the telephoto end. If the upper limit value of the conditional expression (4) is exceeded, it is difficult to move the rear principal point of the first lens unit F toward the image side sufficiently, which makes it difficult to reduce the diameter of the first lens unit F.

In each example, the size and weight of the entire system are reduced while increasing the field angle and the zoom ratio at the same time by meeting the conditional expressions (1) to (4) at the same time.

More preferably, the numerical ranges of the conditional expressions (1) to (4) are set as follows:

$$-2.1 < fG1/f1 < -1.7 \quad (1a)$$

$$1.1 < (G1R1+G1R2)/(G1R1-G1R2) < 1.7 \quad (2a)$$

$$2.6 < fG5/f1 < 3.6 \quad (3a)$$

$$-3.9 < (G5R1+G5R2)/(G5R1-G5R2) < -3.1 \quad (4a)$$

In each example, further preferably, one or more of the following conditions are satisfied.

The refractive index at the Fraunhofer d-line, the Abbe number, and the partial dispersion ratio of the material of the negative lens element G1 are defined as nd1, vd1, and θ1, respectively. The refractive index at d-line, the Abbe number, and the partial dispersion ratio of the material of the positive lens element G5 are defined as nd5, vd5, and θ5, respectively.

The focal lengths of the entire system at the telephoto end and the wide-angle end are defined as ft and fw, respectively. The position of the rear principal point of the first lens unit F (distance from the lens surface of the first lens unit F that is the closest to the image) is defined as Okf. The interval between the principal points of the first lens unit F and the second lens unit V at the wide-angle end is defined as L1w.

The first lens unit F is formed by the F1a lens unit F1a with a negative refractive power and the F1b lens unit F1b with a positive refractive power, with the longest air distance serving as the boundary therebetween. The thickness of the first lens unit F in the optical-axis direction is defined as Df. The focal length of the F1a lens unit F1a is defined as fa. The focal length of the F1b lens unit F1b is defined as fb. The interval between the principal points of the F1a lens unit F1a and the F1b lens unit F1b is defined as HH.

Then, one or more of the following conditional expressions are preferably satisfied:

$$1.75 < nd1 < 2.1 \quad (5)$$

$$25 < vd1 < 43 \quad (6)$$

$$0.562 < \theta1 < 0.640 \quad (7)$$

$$1.45 < nd5 < 1.65 \quad (8)$$

$$62 < vd5 < 91 \quad (9)$$

$$0.530 < \theta5 < 0.550 \quad (10)$$

$$3.0 < ft/f1 < 4.2 \quad (11)$$

$$-7.50 \times 10^{-2} < Okf/f1 < -6.70 \times 10^{-2} \quad (12)$$

$$2.6 < L1w/fw < 3.0 \quad (13)$$

$$0.2 < HH/f1 < 0.5 \quad (14)$$

$$0.8 < Df/HH < 2.1 \quad (15)$$

$$-12.5 < fa/f1 < -6.5 \quad (16)$$

$$0.80 < fb/f1 < 1.20 \quad (17)$$

$$-15 < fa/fb < -5 \quad (18)$$

It is desirable that a plurality of the conditional expressions given above should be satisfied. However, the following effects can be yielded by satisfying at least one of the conditional expressions.

When the refractive index at g-line is defined as Ng, the refractive index at F-line is defined as NF, the refractive index at d-line is defined as Nd, and the refractive index at C-line is defined as NC, then the Abbe number v and the partial dispersion ratio θ are defined as follows:

$$v = (Nd - 1)/(NF - NC)$$

$$\theta = (Ng - NF)/(NF - NC)$$

Next, the technical meaning of each conditional expression given above will be described.

The conditional expression (5) specifies the refractive index at d-line of the material of the negative lens element G1. If the lower limit value of the conditional expression (5) is exceeded, the radius of curvature G1R2 of the image-side lens surface of the negative lens element G1 is reduced, which makes it difficult to correct the spherical aberration at the telephoto end.

If the upper limit value of the conditional expression (5) is exceeded, it is difficult to satisfy the conditional expressions (6) and (7).

The conditional expression (6) specifies the Abbe number of the material of the negative lens element G1. If the lower limit value of the conditional expression (6) is exceeded, the axial chromatic aberration is overcorrected at the telephoto end. If the upper limit value of the conditional expression (6) is exceeded, meanwhile, the axial chromatic aberration is undercorrected at the telephoto end, which makes it difficult to correct the lateral chromatic aberration at the wide-angle end at the same time.

The conditional expression (7) specifies the partial dispersion ratio of the material of the negative lens element G1. If the lower limit value of the conditional expression (7) is exceeded, the secondary spectrum of the axial chromatic aberration is overcorrected at the telephoto end. If the upper limit value of the conditional expression (7) is exceeded, meanwhile, the secondary spectrum of the axial chromatic aberration is disadvantageously undercorrected.

The conditional expression (8) specifies the refractive index of the material of the positive lens element G5. If the lower limit value of the conditional expression (8) is exceeded, the thickness of the positive lens element G5 is increased, which increases the thickness of the first lens unit F. This makes it difficult to reduce the diameter of the first lens unit F.

If the upper limit value of the conditional expression (8) is exceeded, it is difficult to satisfy the conditional expressions (9) and (10).

The conditional expression (9) specifies the Abbe number of the material of the positive lens element G5. If the lower limit value of the conditional expression (9) is exceeded, the axial chromatic aberration is undercorrected at the telephoto end. If the upper limit value of the conditional expression (9) is exceeded, meanwhile, the axial chromatic aberration is overcorrected at the telephoto end, which makes it difficult to correct the lateral chromatic aberration at the wide-angle end at the same time.

The conditional expression (10) specifies the partial dispersion ratio of the material of the positive lens element G5. If the lower limit value of the conditional expression (10) is exceeded, the secondary spectrum of the axial chromatic aberration is undercorrected at the telephoto end. If the upper limit value of the conditional expression (10) is exceeded, meanwhile, the secondary spectrum of the axial chromatic aberration is disadvantageously overcorrected.

If the conditional expressions (5) to (10) are met at the same time, the spherical aberration and the axial chromatic aberration are appropriately corrected at the telephoto end, and the lateral chromatic aberration is appropriately corrected at the wide-angle end, which facilitates increasing the field angle and the zoom ratio and reducing the size and weight of the entire system.

More preferably, the numerical ranges of the conditional expressions (5) to (10) are set as follows:

$$1.79 < nd1 < 1.91 \quad (5a)$$

$$31.0 < vd1 < 38.0 \quad (6a)$$

$$0.575 < \theta1 < 0.600 \quad (7a)$$

$$1.48 < nd5 < 1.60 \quad (8a)$$

$$67 < vd5 < 82 \quad (9a)$$

$$0.535 < \theta5 < 0.550 \quad (10a)$$

The conditional expression (11) specifies the ratio between the focal length of the entire system at the telephoto end and the focal length of the first lens unit F. By applying the conditional expressions (1) to (10) to a zoom lens with a high zoom ratio that meets the conditional expression (11), a great effect is obtained easily.

The conditional expression (12) specifies the ratio between the position of the rear principal point of the first lens unit F and the focal length of the first lens unit F. If the rear principal point of the first lens unit F may not be moved toward the image side sufficiently and the lower limit value is exceeded, it is difficult to reduce the size of the entire system. If the upper limit value is exceeded, meanwhile, it is easy to reduce the diameter of the first lens unit F, but it is difficult to suppress distortion that occurs when zooming is performed from the wide-angle end to a zooming position at a focal length of fwm and variation in off-axis aberration such as coma aberration, and to correct the spherical aberration at the telephoto end at the same time.

The conditional expression (13) specifies the ratio between the interval between the principal points of the first lens unit F and the second lens unit V at the wide-angle end and the focal length at the wide-angle end. If the interval $L1w$ between the principal points of the first lens unit F and the second lens unit V is reduced so that the lower limit value is exceeded, the size of the entire system is advantageously reduced. However, it is difficult to suppress distortion that occurs when zooming is performed from the wide-angle end to a zooming position at a focal length of fwm and variation in off-axis aberration such as coma aberration, and to correct the spherical aberration at the telephoto end at the same time. If the upper limit value is exceeded, it is difficult to reduce the size of the entire system.

If the conditional expressions (11) to (13) are met at the same time, it is easy to suppress distortion that occurs when zooming is performed from the wide-angle end to a zooming position at a focal length of fwm and variation in off-axis aberration such as coma aberration. In addition, it is easy to correct the spherical aberration at the telephoto end well, and to reduce the size and weight of the entire system.

More preferably, the numerical ranges of the conditional expressions (11) to (13) are set as follows:

$$3.10 < ft/f1 < 4.15 \tag{11a}$$

$$-7.30 \times 10^{-2} < Okf/f1 < -6.85 \times 10^{-2} \tag{12a}$$

$$2.70 < L1w/fw < 2.85 \tag{13a}$$

The conditional expression (14) specifies the ratio between the interval between the principal points of the F1$a$ lens unit F1$a$ and the F1$b$ lens unit F1$b$ and the focal length of the first lens unit F.

If the lower limit value of the conditional expression (14) is exceeded, a reduction in size of the entire system is favored. However, the interval between the principal points of the F1$a$ lens unit F1$a$ and the F1$b$ lens unit F1$b$ is reduced, which makes it difficult to suppress distortion that occurs when zooming is performed from the wide-angle end to a zooming position at a focal length of fwm and variation in off-axis aberration such as coma aberration, and to correct the spherical aberration at the telephoto end at the same time. If the upper limit value is exceeded, meanwhile, it is difficult to reduce the size of the entire system.

The conditional expression (15) specifies the ratio between the thickness of the first lens unit F1 in the optical-axis direction and the interval between the principal points of the F1$a$ lens unit F1$a$ and the F1$b$ lens unit F1$b$. In the case where the first lens unit F is formed by five lens elements arranged in the order of negative, positive, positive, positive, and positive lens elements, the power of the F1$a$ lens unit F1$a$ is low in general if the lower limit value is exceeded. Thus, the rear principal point of the first lens unit F may not be moved toward the image side sufficiently, which makes it difficult to reduce the size of the entire system. If the upper limit value is exceeded, meanwhile, the power (refractive power) of the F1$a$ lens unit F1$a$ and the F1$b$ lens unit F1$b$ is increased, which makes it difficult to correct aberrations well.

The conditional expression (16) specifies the ratio between the focal length of the F1$a$ lens unit F1$a$ and the focal length of the first lens unit F1. If the power of the F1$a$ lens unit F1$a$ is reduced so that the lower limit value of the conditional expression (16) is exceeded, it is difficult to reduce the size of the entire system. If the upper limit value of the conditional expression (16) is exceeded, it is difficult to suppress distortion that occurs when zooming is performed from the wide-angle end to a zooming position at a focal length of fwm and variation in off-axis aberration such as coma aberration, and to correct the spherical aberration at the telephoto end at the same time.

The conditional expression (17) specifies the ratio between the focal length of the F1$b$ lens unit F1$b$ and the focal length of the first lens unit F1. If the power of the F1$b$ lens unit F1$b$ is increased so that the lower limit value of the conditional expression (17) is exceeded, it is difficult to suppress distortion that occurs when zooming is performed from the wide-angle end to a zooming position at a focal length of fwm and variation in off-axis aberration such as coma aberration, and to correct the spherical aberration at the telephoto end at the same time. If the upper limit value of the conditional expression (17) is exceeded, meanwhile, it is difficult to reduce the size of the entire system.

The conditional expression (18) specifies the ratio between the focal length of the F1$a$ lens unit F1$a$ and the focal length of the F1$b$ lens unit F1$b$. If the F1$a$ lens unit F1$a$ becomes lower in terms of power compared to the F1$b$ lens unit F1$b$ so that the lower limit value is exceeded, a reduction in size of the entire system is not favored.

If the F1$a$ lens unit F1$a$ becomes higher in terms of power compared to the F1$b$ lens unit F1$b$ so that the upper limit value is exceeded, conversely, it is difficult to suppress distortion that occurs when zooming is performed from the wide-angle end to a zooming position at a focal length of fwm and variation in off-axis aberration such as coma aberration, and to correct the spherical aberration at the telephoto end at the same time.

If the conditional expressions (14) to (18) are met at the same time, the power and the arrangement of the F1$a$ lens unit F1$a$ and the F1$b$ lens unit F1$b$ can be set appropriately. As a result, it is easy to suppress distortion that occurs when zooming is performed from the wide-angle end to a zooming position at a focal length of fwm and variation in off-axis aberration such as coma aberration. In addition, it is easy to correct the spherical aberration at the telephoto end well, and to reduce the size and weight of the entire system.

More preferably, the numerical ranges of the conditional expressions (14) to (18) are set as follows:

$$0.25 < HH/f1 < 0.45 \tag{14a}$$

$$1.0 < Df/HH < 1.65 \tag{15a}$$

$$-12.0 < fa/f1 < -7.0 \tag{16a}$$

$$0.85 < fb/f1 < 1.00 \tag{17a}$$

$$-13 < fa/fb < -7 \tag{18a}$$

According to each example described above, it is possible to obtain a zoom lens with a wide photographing field angle at the wide-angle end of 63° or more and a high zoom ratio of 90 or more that achieves a reduction in size and weight of the entire system by appropriately setting parameters such as the number of lens elements forming the first lens unit F.

EXAMPLE 1

In Example 1, the first lens unit F is formed by five lens elements arranged in the order of negative, positive, positive, positive, and positive lens elements from the object side to the image side. The F1a lens unit F1a is formed by negative and positive lens elements. The F1b lens unit F1b is formed by positive, positive, and positive lens elements. Further, the negative lens element G1 forming the first lens unit F is formed to have a meniscus shape with a convex surface facing toward the object. The positive lens element G3 is formed to have a convex surface on both lens surfaces. The positive lens element G5, which is the closest to the image, of the first lens unit F is formed to have a meniscus shape with a convex surface facing toward the object. As shown in Table 1 to be given later, the respective elements of the first lens unit F are set to meet the conditional expressions (1) to (18).

A zoom lens that has high optical performance, that provides a wide photographing field angle at the wide-angle end of 65.2° and a high zoom ratio of 90, and that is small in size and weight of the entire system is achieved by appropriately forming the first lens unit F so as to meet the conditional expressions (1) to (18).

EXAMPLE 2

The overall lens configuration and the configuration of the first lens unit F of Example 2 are the same as those according to Example 1. The respective elements are set so as to satisfy the conditional expressions (1) to (18).

A zoom lens that has high optical performance, that provides a wide photographing field angle at the wide-angle end of 63.44° and a high zoom ratio of 120, and that is small in size and weight of the entire system is achieved by appropriately forming the first lens unit F so as to meet the conditional expressions (1) to (18).

EXAMPLE 3

The overall lens configuration and the configuration of the first lens unit F of Example 3 are the same as those according to Example 1 and Example 2. The respective elements of the first lens unit F are set so as to satisfy the conditional expressions (1) to (18).

A zoom lens that has high optical performance, that provides a wide photographing field angle at the wide-angle end of 63.44° and a high zoom ratio of 90, and that is small in size and weight of the entire system is achieved by appropriately forming the first lens unit F so as to meet the conditional expressions (1) to (18).

According to each example described above, it is possible to obtain a zoom lens that achieves a reduction in size and weight of the entire lens system while increasing the field angle and the zoom ratio at the same time, and an image pickup apparatus including the zoom lens.

While preferred embodiments of the present invention have been described above, the present invention is not limited thereto, and various modifications and alterations may be made without departing from the scope and spirit of the present invention.

FIG. 7 is a schematic diagram of an image pickup apparatus (television camera system) in which the zoom lens according to each example is used as a photographing optical system. In FIG. 7, reference numeral 101 denotes the zoom lens according to any one of Examples 1 to 3. Reference numeral 201 denotes a camera. The zoom lens 101 is removably attached to the camera 201. Reference numeral 301 denotes an image pickup apparatus formed by mounting the zoom lens 101 to the camera 201. The zoom lens 101 includes the first lens unit F, the second lens unit V, and lens units CR provided at a stage subsequent to the second lens unit V. The first lens unit F includes a lens unit (Fib) for focusing. The second lens unit V moves on the optical axis for magnification variation. The lens units C and R provided at a stage subsequent to the second lens unit V are referred here a the lens unit CR. The lens unit CR includes the third lens unit C which moves on the optical axis to correct image plane variation that occurs along with magnification variation, and the fourth lens unit R for image formation. The lens unit CR may further include a lens unit (extender) that may be removably provided in the optical path to change the focal length of the entire zoom lens system.

The lens unit CR may also include an image-stabilizing optical system that is displaced in the vertical direction with respect to the optical axis for image stabilization. "SP" denotes an aperture stop. Reference numerals 102 to 104 denote drive mechanisms such as a helicoid or a cam that drive the first lens unit F, the second lens unit V, and the third lens unit C which corrects image plane variation that occurs along with magnification variation, respectively, in the optical-axis direction.

Reference numerals 105 to 108 denote motors (drive units) that electrically drive the drive mechanisms 102 to 104 and the aperture stop SP, respectively. Reference numerals 109 to 112 denote detectors such as an encoder, a potentiometer, or a photosensor that detect the position on the optical axis of the first lens unit F, the second lens unit V, and the third lens unit C, which corrects image plane variation that occurs along with magnification variation, and the aperture diameter of the aperture stop SP, respectively. In the camera 201, reference numeral 202 denotes a glass block corresponding to an optical filter or a color separation optical system, and reference numeral 203 denotes a solid-state image pickup element (photoelectric conversion element) such as a CCD sensor or a CMOS sensor that receives light for an image of the object formed by the zoom lens 101. Reference numerals 204 and 113 denote CPUs that control various drives of the camera 201 and the zoom lens 101, respectively.

An image pickup apparatus with high optical performance is implemented by applying the zoom lens according to the present invention to a television camera as described above. However, the configuration of the zoom lens according to present invention and the camera are not limited to that of FIG. 7, and various modifications and alterations may be made without departing from the scope and spirit of the present invention. Besides, the zoom lens according to the present invention may also be applied to digital cameras, video cameras, and so forth.

Numerical examples of the present invention will be described below. In each numerical example, "i" denotes the order of the surface from the object side. "ri" denotes the radius of curvature of the i-th surface from the object side. "di" denotes the distance (or thickness) between the i-th surface and the (i+1)-th surface from the object side. "ndi" and "vdi" denote the refractive index and the Abbe number, respectively, of the i-th optical member. "BF" denotes an air-conversion length of back-focus, indicated in terms of distance from the final surface of the glass block P. The last three surfaces are surfaces of a grass block such as a filter. Dimensions are given in units of millimeters (mm).

To define an aspherical shape, an X-axis is defined in the optical-axis direction, an H-axis is defined in the direction perpendicular to the optical axis, and the travel direction of light is defined as positive. "R" denotes the paraxial radius of curvature, "k" denotes a conical constant, and "A4", "A6", "A8, "A10", "A12", "A14", "A16", "A3", "A5", "A7", "A9", "A11", "A13", and "A15" denote aspheric coefficients. Then, the aspherical shape is expressed by the following expression, where the scientific notation "e-Z" is equivalent to the exponential notation "×10⁻ᶻ". Surfaces having an aspherical shape are denoted by an asterisk ("*") added to the surface number.

$$X = \frac{H^2/R}{1+\sqrt{1-(1+k)(H/R)^2}} + A4H^4 + A6H^6 +$$

-continued $$A8H^8 + A10H^{10} + A12H^{12} + A14H^{14} + A16H^{16}$$
$$A3H^3 + A5H^5 + A7H^7 + A9H^9 + A11H^{11} + A13H^{13} + A15H^{15}$$

The values corresponding to the conditional expressions for the examples are shown in Table 1.

Numerical Example 1

| | Unit mm | | | | |
|---|---|---|---|---|---|
| | Surface data | | | | |
| Surface number | r | d | nd | νd | Effective diameter |
| 1 | 1571.411 | 5.91 | 1.90366 | 31.3 | 212.83 |
| 2 | 361.491 | 3.13 | | | 205.43 |
| 3 | 389.831 | 20.85 | 1.43387 | 95.1 | 204.88 |
| 4 | −1519.134 | 25.29 | | | 203.52 |
| 5 | 379.388 | 19.40 | 1.43387 | 95.1 | 198.91 |
| 6 | −1690.060 | 0.25 | | | 198.64 |
| 7 | 270.376 | 20.46 | 1.43387 | 95.1 | 194.91 |
| 8 | 5840.434 | 1.18 | | | 193.83 |
| 9 | 190.778 | 14.41 | 1.59240 | 68.3 | 182.16 |
| 10 | 365.545 | (Variable) | | | 180.35 |
| 11* | 11015.733 | 2.20 | 2.00330 | 28.3 | 48.62 |
| 12 | 41.065 | 10.49 | | | 41.92 |
| 13 | −62.377 | 1.40 | 1.88300 | 40.8 | 41.20 |
| 14 | 65.176 | 9.88 | 1.95906 | 17.5 | 42.38 |
| 15 | −89.087 | 2.72 | | | 43.74 |
| 16 | −51.909 | 1.60 | 1.83400 | 37.2 | 43.88 |
| 17 | −103.320 | (Variable) | | | 46.02 |
| 18 | 115.185 | 11.58 | 1.59201 | 67.0 | 78.48 |
| 19* | −2087.691 | 0.50 | | | 78.91 |
| 20 | 142.758 | 13.08 | 1.59201 | 67.0 | 80.06 |
| 21 | −231.655 | 0.20 | | | 79.67 |
| 22 | 122.793 | 2.50 | 1.80518 | 25.4 | 76.01 |
| 23 | 57.717 | 18.11 | 1.43387 | 95.1 | 71.57 |
| 24 | −564.234 | 0.50 | | | 70.45 |
| 25* | 364.246 | 6.50 | 1.49700 | 81.5 | 69.33 |
| 26 | −414.835 | (Variable) | | | 68.15 |
| 27 (Stop) | ∞ | 5.89 | | | 31.81 |
| 28 | −147.172 | 1.40 | 1.81600 | 46.6 | 32.30 |
| 29 | 46.924 | 1.05 | | | 31.20 |
| 30 | 37.303 | 4.69 | 1.80809 | 22.8 | 31.30 |
| 31 | 420.501 | 3.37 | | | 30.90 |
| 32 | −76.047 | 1.40 | 1.88300 | 40.8 | 30.60 |
| 33 | 191.170 | 11.30 | | | 30.40 |
| 34 | −41.223 | 1.78 | 1.65160 | 58.5 | 26.67 |
| 35 | 580.472 | 3.52 | 1.80518 | 25.4 | 27.78 |
| 36 | −156.414 | 6.46 | | | 28.43 |
| 37 | −103.332 | 5.71 | 1.70154 | 41.2 | 30.13 |
| 38 | −53.979 | 10.53 | | | 31.42 |
| 39 | −216.194 | 4.49 | 1.50137 | 56.4 | 32.25 |
| 40 | −43.973 | 0.74 | | | 32.44 |
| 41 | −72.585 | 1.30 | 1.88300 | 40.8 | 31.89 |
| 42 | 61.011 | 9.51 | 1.50137 | 56.4 | 32.28 |
| 43 | −35.679 | 0.20 | | | 33.06 |
| 44 | 96.272 | 8.69 | 1.49700 | 81.5 | 32.15 |
| 45 | −31.822 | 1.70 | 1.88300 | 40.8 | 31.45 |
| 46 | −176.143 | 2.14 | | | 31.79 |
| 47 | 50.459 | 8.14 | 1.48749 | 70.2 | 31.95 |
| 48 | −79.751 | 5.00 | | | 31.49 |
| 49 | ∞ | 33.00 | 1.60859 | 46.4 | 60.00 |
| 50 | ∞ | 13.20 | 1.51633 | 64.2 | 60.00 |
| 51 | ∞ | | | | 60.00 |
| Image plane | ∞ | | | | |
| | Aspherical surface data | | | | |
| | Eleventh surface | | | | |

K = −2.61129e+006  A4 = 1.14924e−006  A6 = −4.20242e−010  A8 = 7.06050e−012
A10 = 1.71748e−014  A12 = −3.95143e−018  A14 = −2.50492e−020  A16 = 2.74832e−023

-continued

Unit mm

A3 = −7.41007e−007   A5 = −2.86209e−008   A7 = 4.68402e−011   A9 = −6.67517e−013
A11 = −2.87644e−016  A13 = 1.44174e−018   A15 = −1.26241e−021

Nineteenth surface

K = −8.09196e+003    A4 = 2.70610e−007    A6 = 1.07566e−009    A8 = −3.82716e−014
A10 = −1.89869e−016  A12 = 1.74435e−020   A14 = −2.31461e−023  A16 = 5.87253e−027
A3 = −1.02923e−007   A5 = −2.58308e−008   A7 = −1.15844e−011   A9 = 3.14187e−015
A11 = 2.64931e−018   A13 = 8.56747e−022   A15 = −2.81713e−025

Twenty-fifth surface

K = 6.92275e+001     A4 = −4.53959e−007   A6 = −6.59771e−011   A8 = −3.55842e−013
A10 = −1.48669e−016  A12 = 8.98957e−020   A14 = 6.50522e−022   A16 = 1.24233e−026
A3 = 7.06566e−007    A5 = −1.77804e−008   A7 = 3.13155e−011    A9 = 8.81552e−016
A11 = −1.46851e−017  A13 = 1.62371e−021   A15 = −1.37737e−023

Various data
Zoom ratio 90.00

|  | Wide-angle | Intermediate | Telephoto |
|---|---|---|---|
| Focal length | 8.60 | 341.63 | 774.00 |
| F number | 1.80 | 1.80 | 4.00 |
| Field angle | 32.60 | 0.92 | 0.41 |
| Image height | 5.50 | 5.50 | 5.50 |
| Overall lens length | 641.10 | 641.10 | 641.10 |
| BF | 18.00 | 18.00 | 18.00 |
| d10 | 3.03 | 178.18 | 186.75 |
| d17 | 279.71 | 41.92 | 3.07 |
| d26 | 3.00 | 65.65 | 95.93 |
| Entrance pupil position | 126.14 | 3180.72 | 9423.17 |
| Exit pupil position | 141.46 | 141.46 | 141.46 |
| Front principal point position | 135.34 | 4467.70 | 15049.59 |
| Rear principal point position | 9.40 | −323.63 | −756.00 |

Zoom lens unit data

| Group | First surface | Focal length | Lens structure length | Front principal point position | Rear principal point position |
|---|---|---|---|---|---|
| 1 | 1 | 248.14 | 110.88 | 64.60 | −17.20 |
| 2 | 11 | −27.25 | 28.28 | 3.76 | −16.43 |
| 3 | 18 | 70.50 | 52.98 | 12.00 | −25.30 |
| 4 | 27 | 40.01 | 145.21 | 58.78 | 16.17 |

Single lens data

| Lens | First surface | Focal length |
|---|---|---|
| 1 | 1 | −516.86 |
| 2 | 3 | 715.59 |
| 3 | 5 | 714.36 |
| 4 | 7 | 651.06 |
| 5 | 9 | 651.23 |
| 6 | 11 | −40.75 |
| 7 | 13 | −35.70 |
| 8 | 14 | 39.99 |
| 9 | 16 | −126.08 |
| 10 | 18 | 184.10 |
| 11 | 20 | 150.63 |
| 12 | 22 | −136.36 |
| 13 | 23 | 121.45 |
| 14 | 25 | 390.18 |
| 15 | 28 | −43.24 |
| 16 | 30 | 49.86 |
| 17 | 32 | −61.11 |
| 18 | 34 | −58.76 |
| 19 | 35 | 151.95 |
| 20 | 37 | 152.86 |
| 21 | 39 | 108.69 |
| 22 | 41 | −37.15 |
| 23 | 42 | 46.24 |
| 24 | 44 | 49.09 |
| 25 | 45 | −43.97 |
| 26 | 47 | 64.51 |
| 27 | 49 | 0.00 |
| 28 | 50 | 0.00 |

Numerical Example 2

| | Unit mm | | | | |
|---|---|---|---|---|---|
| | Surface data | | | | |
| Surface number | r | d | nd | νd | Effective diameter |
| 1 | 5087.363 | 6.21 | 1.83400 | 37.2 | 210.30 |
| 2 | 351.007 | 2.53 | | | 203.25 |
| 3 | 362.932 | 25.89 | 1.43387 | 95.1 | 203.13 |
| 4 | −675.565 | 27.27 | | | 202.31 |
| 5 | 358.936 | 19.85 | 1.43387 | 95.1 | 199.79 |
| 6 | −2017.904 | 0.26 | | | 199.41 |
| 7 | 248.568 | 21.36 | 1.43387 | 95.1 | 194.63 |
| 8 | 3022.229 | 1.24 | | | 193.41 |
| 9 | 198.459 | 12.41 | 1.49700 | 81.5 | 181.43 |
| 10 | 339.878 | (Variable) | | | 179.63 |
| 11* | 27171.632 | 2.06 | 2.00330 | 28.3 | 44.33 |
| 12 | 40.455 | 9.41 | | | 38.76 |
| 13 | −57.455 | 1.31 | 1.83481 | 42.7 | 38.10 |
| 14 | 58.761 | 8.84 | 1.95906 | 17.5 | 41.33 |
| 15 | −84.153 | 2.00 | | | 42.20 |
| 16 | −56.592 | 1.50 | 1.85026 | 32.3 | 42.33 |
| 17 | −191.622 | (Variable) | | | 44.41 |
| 18 | 130.302 | 14.03 | 1.59201 | 67.0 | 87.80 |
| 19* | −266.886 | 0.20 | | | 88.28 |
| 20 | 104.921 | 14.79 | 1.60311 | 60.6 | 89.75 |
| 21 | −461.141 | 0.20 | | | 89.04 |
| 22 | 145.682 | 2.38 | 1.80518 | 25.4 | 83.97 |
| 23 | 56.875 | 21.27 | 1.43875 | 94.9 | 77.22 |
| 24 | −415.562 | 0.20 | | | 75.80 |
| 25* | 334.859 | 5.07 | 1.60311 | 60.6 | 73.92 |
| 26 | −791.564 | (Variable) | | | 72.88 |
| 27 (Stop) | ∞ | 6.01 | | | 33.65 |
| 28 | −151.903 | 1.40 | 1.81600 | 46.6 | 32.30 |
| 29 | 38.918 | 0.48 | | | 31.20 |
| 30 | 32.486 | 4.77 | 1.80809 | 22.8 | 31.30 |
| 31 | 164.904 | 3.63 | | | 30.90 |
| 32 | −85.587 | 1.40 | 1.88300 | 40.8 | 30.60 |
| 33 | 162.386 | 11.41 | | | 30.40 |
| 34 | −46.174 | 1.71 | 1.65160 | 58.5 | 26.66 |
| 35 | 1173.752 | 3.08 | 1.80518 | 25.4 | 27.46 |
| 36 | −398.076 | 5.65 | | | 27.99 |
| 37 | −916.080 | 7.93 | 1.70154 | 41.2 | 29.68 |
| 38 | −63.371 | 9.95 | | | 30.82 |
| 39 | −87.899 | 3.77 | 1.50137 | 56.4 | 30.42 |
| 40 | −39.673 | 0.70 | | | 30.61 |
| 41 | −66.997 | 1.69 | 1.88300 | 40.8 | 30.00 |
| 42 | 58.343 | 9.03 | 1.50137 | 56.4 | 30.36 |
| 43 | −40.472 | 1.95 | | | 31.23 |
| 44 | 200.255 | 8.72 | 1.49700 | 81.5 | 30.78 |
| 45 | −30.785 | 1.42 | 1.88300 | 40.8 | 30.34 |
| 46 | −76.296 | 0.30 | | | 31.18 |
| 47 | 51.386 | 6.67 | 1.48749 | 70.2 | 31.67 |
| 48 | −89.589 | 5.00 | | | 31.29 |
| 49 | ∞ | 33.00 | 1.60859 | 46.4 | 60.00 |
| 50 | ∞ | 13.20 | 1.51633 | 64.2 | 60.00 |
| 51 | ∞ | | | | 60.00 |
| Image plane | ∞ | | | | |

Aspherical surface data

Eleventh surface

K = −2.96575e+006  A4 = 2.40886e−007  A6 = −5.19472e−009  A8 = 1.20546e−011
A10 = 1.46289e−014  A12 = 7.72681e−018  A14 = −2.72378e−019  A16 = 9.42238e−023
A3 = 8.19956e−007  A5 = 5.83280e−008  A7 = 1.05651e−010  A9 = −6.19279e−013
A11 = −1.86517e−015  A13 = 8.45388e−018  A15 = −1.53991e−021

Nineteenth surface

K = 1.88006e+001  A4 = 3.14591e−007  A6 = 3.18488e−011  A8 = 1.95553e−013
A10 = −8.85951e−017  A12 = 1.28602e−019  A14 = 1.26173e−023  A16 = −4.42209e−027
A3 = 2.20105e−008  A5 = 2.18044e−009  A7 = −4.76795e−012  A9 = −1.44709e−015
A11 = 4.99541e−019  A13 = −3.52602e−021  A15 = 5.11761e−025

Twenty-fifth surface

K = 6.21525e+001  A4 = −4.51427e−007  A6 = −4.21936e−010  A8 = −4.54373e−014
A10 = −1.38519e−016  A12 = 5.59824e−021  A14 = 1.50130e−022  A16 = 2.59244e−026

-continued

| Unit mm | | | |
|---|---|---|---|
| A3 = −4.12537e−007 | A5 = 9.02787e−010 | A7 = 1.31804e−011 | A9 = −2.79933e−016 |
| A11 = −1.81042e−018 | A13 = 1.42334e−021 | A15 = −4.68969e−024 | |

Various data
Zoom ratio 120.00

| | Wide-angle | Intermediate | Telephoto |
|---|---|---|---|
| Focal length | 8.90 | 343.29 | 1068.00 |
| F number | 1.80 | 1.80 | 5.50 |
| Field angle | 31.72 | 0.92 | 0.30 |
| Image height | 5.50 | 5.50 | 5.50 |
| Overall lens length | 658.22 | 658.22 | 658.22 |
| BF | 16.80 | 16.80 | 16.80 |
| d10 | 3.04 | 189.34 | 201.28 |
| d17 | 292.26 | 52.03 | 1.70 |
| d26 | 3.00 | 56.93 | 95.31 |
| Entrance pupil position | 128.80 | 3079.01 | 13737.39 |
| Exit pupil position | 147.15 | 147.15 | 147.15 |
| Front principal point position | 138.31 | 4326.38 | 23556.01 |
| Rear principal point position | 7.90 | −326.48 | −1051.20 |

Zoom lens unit data

| Group | First surface | Focal length | Lens structure length | Front principal point position | Rear principal point position |
|---|---|---|---|---|---|
| 1 | 1 | 260.58 | 117.01 | 68.63 | −17.96 |
| 2 | 11 | −25.50 | 25.12 | 4.00 | −13.51 |
| 3 | 18 | 67.00 | 58.13 | 12.79 | −27.87 |
| 4 | 27 | 39.49 | 142.86 | 58.08 | 23.77 |

Single lens data

| Lens | First surface | Focal length |
|---|---|---|
| 1 | 1 | −449.46 |
| 2 | 3 | 546.93 |
| 3 | 5 | 702.37 |
| 4 | 7 | 621.24 |
| 5 | 9 | 929.74 |
| 6 | 11 | −40.05 |
| 7 | 13 | −34.43 |
| 8 | 14 | 36.72 |
| 9 | 16 | −94.25 |
| 10 | 18 | 149.34 |
| 11 | 20 | 142.57 |
| 12 | 22 | −116.21 |
| 13 | 23 | 115.32 |
| 14 | 25 | 389.30 |
| 15 | 28 | −37.65 |
| 16 | 30 | 48.76 |
| 17 | 32 | −62.94 |
| 18 | 34 | −67.87 |
| 19 | 35 | 366.12 |
| 20 | 37 | 96.12 |
| 21 | 39 | 139.95 |
| 22 | 41 | −34.89 |
| 23 | 42 | 48.96 |
| 24 | 44 | 54.21 |
| 25 | 45 | −58.97 |
| 26 | 47 | 67.81 |
| 27 | 49 | 0.00 |
| 28 | 50 | 0.00 |

Numerical Example 3

| Unit mm | | | | | |
|---|---|---|---|---|---|
| Surface data | | | | | |
| Surface number | r | d | nd | vd | Effective diameter |
| 1 | 3682.437 | 6.00 | 1.80100 | 35.0 | 209.40 |
| 2 | 353.944 | 3.79 | | | 201.72 |

-continued

| | | Unit mm | | | |
|---|---|---|---|---|---|
| 3 | 374.260 | 22.74 | 1.43387 | 95.1 | 201.01 |
| 4 | −959.873 | 25.71 | | | 199.87 |
| 5 | 389.724 | 19.81 | 1.43387 | 95.1 | 196.38 |
| 6 | −1195.622 | 0.25 | | | 196.08 |
| 7 | 253.678 | 20.51 | 1.43387 | 95.1 | 191.33 |
| 8 | 3472.541 | 1.20 | | | 190.14 |
| 9 | 183.245 | 13.48 | 1.49700 | 81.5 | 177.83 |
| 10 | 326.627 | (Variable) | | | 176.00 |
| 11* | 10080.140 | 2.22 | 2.00330 | 28.3 | 47.00 |
| 12 | 39.688 | 10.59 | | | 40.66 |
| 13 | −55.354 | 1.41 | 1.77250 | 49.6 | 40.04 |
| 14 | 68.240 | 8.91 | 1.95906 | 17.5 | 43.34 |
| 15 | −124.975 | 3.48 | | | 44.59 |
| 16 | −53.580 | 1.61 | 1.88300 | 40.8 | 44.81 |
| 17 | −81.416 | (Variable) | | | 46.74 |
| 18 | 118.917 | 10.96 | 1.59201 | 67.0 | 80.82 |
| 19* | −1857.932 | 0.50 | | | 81.21 |
| 20 | 140.371 | 12.59 | 1.59201 | 67.0 | 82.57 |
| 21 | −231.138 | 0.20 | | | 82.29 |
| 22 | 116.015 | 2.48 | 1.80518 | 25.4 | 78.13 |
| 23 | 56.051 | 19.40 | 1.43387 | 95.1 | 73.18 |
| 24 | −481.868 | 0.50 | | | 72.03 |
| 25* | 354.467 | 5.65 | 1.49700 | 81.5 | 70.66 |
| 26 | −520.367 | (Variable) | | | 69.61 |
| 27 (Stop) | ∞ | 5.92 | | | 32.66 |
| 28 | −147.410 | 1.40 | 1.81600 | 46.6 | 32.30 |
| 29 | 47.772 | 1.16 | | | 31.20 |
| 30 | 38.288 | 4.59 | 1.80809 | 22.8 | 31.30 |
| 31 | 460.736 | 3.35 | | | 30.90 |
| 32 | −75.747 | 1.40 | 1.88300 | 40.8 | 30.60 |
| 33 | 196.125 | 11.28 | | | 30.40 |
| 34 | −42.990 | 1.71 | 1.65160 | 58.5 | 27.35 |
| 35 | 444.480 | 3.72 | 1.80518 | 25.4 | 28.43 |
| 36 | −162.698 | 6.28 | | | 29.08 |
| 37 | −102.693 | 5.29 | 1.70154 | 41.2 | 30.66 |
| 38 | −53.709 | 11.00 | | | 31.81 |
| 39 | −181.826 | 4.43 | 1.50137 | 56.4 | 32.48 |
| 40 | −43.749 | 0.61 | | | 32.68 |
| 41 | −76.276 | 1.43 | 1.88300 | 40.8 | 32.12 |
| 42 | 63.409 | 9.45 | 1.50137 | 56.4 | 32.45 |
| 43 | −36.374 | 0.20 | | | 33.18 |
| 44 | 101.048 | 8.92 | 1.49700 | 81.5 | 32.15 |
| 45 | −31.027 | 2.94 | 1.88300 | 40.8 | 31.37 |
| 46 | −177.800 | 1.43 | | | 31.80 |
| 47 | 52.228 | 7.15 | 1.48749 | 70.2 | 32.14 |
| 48 | −76.349 | 5.00 | | | 31.82 |
| 49 | ∞ | 33.00 | 1.60859 | 46.4 | 60.00 |
| 50 | ∞ | 13.20 | 1.51633 | 64.2 | 60.00 |
| 51 | ∞ | | | | 60.00 |
| Image plane | ∞ | | | | |

Aspherical surface data

Eleventh surface

K = −2.61129e+006  A4 = 9.37757e−007  A6 = −4.65459e−010  A8 = 6.89688e−012
A10 = 1.60690e−014  A12 = −4.45369e−018  A14 = −1.84721e−020  A16 = 2.51882e−023
A3 = −2.18190e−007  A5 = −2.65845e−008  A7 = 4.37144e−011  A9 = −6.18552e−013
A11 = −2.52689e−016  A13 = 1.20039e−018  A15 = −1.17896e−021

Nineteenth surface

K = −8.09196e+003  A4 = 2.65482e−007  A6 = 1.10690e−009  A8 = −3.67018e−014
A10 = −2.04989e−016  A12 = 1.70275e−020  A14 = −2.57323e−023  A16 = 6.69050e−027
A3 = −6.04194e−007  A5 = −2.61205e−008  A7 = −1.25725e−011  A9 = 3.50991e−015
A11 = 3.11710e−018  A13 = 8.21780e−022  A15 = −2.93153e−025

Twenty-fifth surface

K = 8.21911e+001  A4 = −4.01900e−007  A6 = −1.56607e−010  A8 = −3.54010e−013
A10 = −1.32830e−016  A12 = 9.59663e−020  A14 = 6.88034e−022  A16 = 1.65592e−026
A3 = −3.28244e−007  A5 = −1.90100e−008  A7 = 3.15682e−011  A9 = 1.63011e−015
A11 = −1.54841e−017  A13 = 1.09410e−021  A15 = −1.51547e−023

-continued

| Unit mm | | | |
|---|---|---|---|
| Various data Zoom ratio 90.00 | | | |
| | Wide-angle | Intermediate | Telephoto |
| Focal length | 8.90 | 343.29 | 801.00 |
| F number | 1.80 | 1.80 | 4.20 |
| Field angle | 31.72 | 0.92 | 0.39 |
| Image height | 5.50 | 5.50 | 5.50 |
| Overall lens length | 643.92 | 643.92 | 643.92 |
| BF | 18.45 | 18.45 | 18.45 |
| d10 | 3.16 | 180.44 | 189.58 |
| d17 | 280.43 | 42.17 | 2.12 |
| d26 | 3.00 | 63.98 | 94.88 |
| Entrance pupil position | 128. | 903099.50 | 9451.79 |
| Exit pupil position | 155.78 | 155.78 | 155.78 |
| Front principal point position | 138.37 | 4300.92 | 14924.87 |
| Rear principal point position | 9.55 | −324.84 | −782.55 |

Zoom lens unit data

| Group | First surface | Focal length | Lens structure length | Front principal point position | Rear principal point position |
|---|---|---|---|---|---|
| 1 | 1 | 251.92 | 113.51 | 66.47 | −17.82 |
| 2 | 11 | −27.50 | 28.23 | 3.52 | −17.18 |
| 3 | 18 | 70.00 | 52.28 | 11.70 | −25.12 |
| 4 | 27 | 41.63 | 144.86 | 59.68 | 18.15 |

Single lens data

| Lens | First surface | Focal length |
|---|---|---|
| 1 | 1 | −485.97 |
| 2 | 3 | 622.28 |
| 3 | 5 | 678.31 |
| 4 | 7 | 627.97 |
| 5 | 9 | 812.06 |
| 6 | 11 | −39.39 |
| 7 | 13 | −39.18 |
| 8 | 14 | 46.47 |
| 9 | 16 | −181.41 |
| 10 | 18 | 188.51 |
| 11 | 20 | 148.88 |
| 12 | 22 | −135.97 |
| 13 | 23 | 116.71 |
| 14 | 25 | 423.90 |
| 15 | 28 | −43.85 |
| 16 | 30 | 50.90 |
| 17 | 32 | −61.38 |
| 18 | 34 | −59.83 |
| 19 | 35 | 146.97 |
| 20 | 37 | 152.75 |
| 21 | 39 | 113.21 |
| 22 | 41 | −38.80 |
| 23 | 42 | 47.41 |
| 24 | 44 | 48.72 |
| 25 | 45 | −42.72 |
| 26 | 47 | 64.58 |
| 27 | 49 | 0.00 |
| 28 | 50 | 0.00 |

TABLE 1

| Conditional expression number | Expression | Example 1 | Example 2 | Example 3 |
|---|---|---|---|---|
| (1) | fG1/f1 | −2.08 | −1.72 | −1.93 |
| (2) | (G1R1 + G1R2)/(G1R1 − G1R2) | 1.60 | 1.15 | 1.21 |
| (3) | fG5/f1 | 2.62 | 3.57 | 3.22 |
| (4) | (G5R1 + G5R2)/(G5R1 − G5R2) | −3.18 | −3.81 | −3.56 |
| (5) | nd1 | 1.904 | 1.834 | 1.801 |
| (6) | νd1 | 31.3 | 37.2 | 35.0 |
| (7) | θ1 | 0.595 | 0.578 | 0.586 |
| (8) | nd5 | 1.592 | 1.497 | 1.497 |
| (9) | νd5 | 68.3 | 81.5 | 81.5 |
| (10) | θ5 | 0.546 | 0.537 | 0.537 |
| (11) | ft/f1 | 3.12 | 4.10 | 3.18 |
| (12) | Okf/f1 | −0.0693 | −0.0689 | −0.0707 |

TABLE 1-continued

| Conditional expression number | Expression | Example 1 | Example 2 | Example 3 |
|---|---|---|---|---|
| (13) | L1w/fw | 2.79 | 2.81 | 2.75 |
| (14) | HH/f1 | 0.27 | 0.40 | 0.34 |
| (15) | Df/HH | 1.63 | 1.14 | 1.31 |
| (16) | fa | −7.701 | −10.619 | −9.349 |
| (17) | fb | 0.917 | 0.948 | 0.937 |
| (18) | fa/fb | −8.40 | −11.20 | −9.98 |

In the examples, the refractive power of the third lens unit is defined to be positive. However, the present invention is not limited thereto, and the refractive power of the third lens unit may be negative. In the examples, moreover, the first lens unit is formed by a total of five lens elements. However, the present invention is not limited thereto, and the first lens unit may be formed by four or six or more lens elements. In the case where the first lens unit is formed by four lens elements, it is desirable that the positive lens element G3 or the positive lens element G4 should be dispensed with, and that the positive refractive power for the omitted lens element should be distributed to the remaining positive lens element and the positive lens element G5. That is, it is desirable to dispense with one of the lens elements of the F1b lens unit. In the case where the first lens unit is formed by six or more lens elements, meanwhile, it is desirable that the positive lens element G2 should be replaced with two positive lens elements with a refractive power lower than that of the positive lens element G2. That is, it is desirable to add one lens element to the F1a lens unit. In this event, the refractive power of the negative lens element G1 may be increased. In the case where the number of lens elements of the first lens unit is increased to more than five, it is also possible to increase the number of lens elements of the F1b lens unit.

According to the present invention which has been described above, it is possible to obtain a zoom lens that facilitates increasing the zoom ratio and the field angle and that facilitates reducing the size and weight of the entire system.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-042075 filed Feb. 28, 2011, which is hereby incorporated by reference herein in its entirety.

What is claimed is:

1. A zoom lens comprising:
a first lens unit with a positive refractive power that does not move for zooming;
a second lens unit with a negative refractive power that moves during zooming;
a third lens unit that moves during zooming; and
a fourth lens unit with a positive refractive power that does not move for zooming,
the lens units being arranged along an optical axis of the zoom lens in order from an object plane to an image plane,
wherein the first lens unit includes a negative lens element G1 having a meniscus shape with a convex surface facing towards the object plane, a positive lens element G2, a positive lens element G3, and a positive lens element G5 having a meniscus shape with a convex surface facing towards the object plane, the lens elements being arranged in this order from the object plane to the image plane, and
wherein, when radii of curvature of object-plane side and image-plane side lens surfaces of the negative lens element G1 are defined as G1R1 and G1R2, respectively, a focal length of the negative lens element G1 is defined as fG1, radii of curvature of object-plane side and image-plane side lens surfaces of the positive lens element G5 are defined as G5R1 and G5R2, respectively, a focal length of the positive lens element G5 is defined as fG5, and a focal length of the first lens unit is defined as f1, then the following conditional expressions are satisfied:

$-2.2 < fG1/f1 < -1.5$ $1.0 < (G1R1+G1R2)/(G1R1-G1R2) < 2.0$ $2.4 < fG5/f1 < 3.7$ $-4.0 < (G5R1+G5R2)/(G5R1-G5R2) < -3.0$.

2. The zoom lens according to claim 1,
wherein when a refractive index at the Fraunhofer d-line, an Abbe number, and a partial dispersion ratio of a material of the negative lens element G1 are defined as nd1, vd1, and θ1, respectively, and a refractive index at the d-line, an Abbe number, and a partial dispersion ratio of a material of the positive lens element G5 are defined as nd5, vd5, and θ5, respectively, then the following conditional expressions are further satisfied:

$1.75 < nd1 < 2.1$ $25 < vd1 < 43$ $0.562 < θ1 < 0.640$ $1.45 < nd5 < 1.65$ $62 < vd5 < 91$ $0.530 < θ5 < 0.550$.

3. The zoom lens according to claim 1,
wherein when a focal length of the entire zoom lens at a telephoto end is defined as ft, a focal length of the entire zoom lens at a wide-angle end is defined as fw, a position of a rear principal point of the first lens unit is defined as Okf, and an interval between principal points of the first lens unit and the second lens unit at the wide-angle end is defined as L1w, then the following conditional expressions are satisfied:

$3.0 < ft/f1 < 4.2$ $-7.50 \times 10^{-2} < Okf/f1 < -6.70 \times 10^{-2}$ $2.6 < L1w/fw < 3.0$.

4. The zoom lens according to claim 1, wherein the first lens unit further includes a positive lens element G4 with a convex surface facing towards the object plane, and
wherein, in the first lens unit, the negative lens element G1 and the positive lens element G2, which are arranged in this order from the object plane to the image plane, form a first lens sub-unit F1a, and
the positive lens element G3, the positive lens element G4, and the positive lens element G5, which are arranged in this order from the object plane to the image plane, form a second lens sub-unit F1b.

5. The zoom lens according to claim 4,
wherein the first lens sub-unit F1a has a negative refractive power and the second lens sub-unit F1b has a positive refractive power, and an air distance serving as a boundary exist therebetween, and
wherein, when a thickness of the first lens unit in an optical-axis direction is defined as Df, a focal length of the first lens sub-unit F1a is defined as fa, a focal length of the second lens sub-unit F1b is defined as fb, and an interval between principal points of the first lens sub-unit F1a and the second lens sub-unit F1b is defined as HH, then the following conditional expressions are satisfied:

$$0.2 < HH/f1 < 0.5$$

$$0.8 < Df/HH < 2.1$$

$$-12.0 < fa/f1 < -6.5$$

$$0.80 < fb/f1 < 1.20$$

$$-15 < fa/fb < -5.$$

6. The zoom lens according to claim 4,
wherein the first lens sub-unit F1a does not move during focusing and the second lens sub-unit F1b moves towards the object side during focusing.

7. The zoom lens according to claim 1, wherein, during zooming from the wide-angle end to the telephoto end,
the second lens unit moves monotonously along the optical axis towards the image for image magnification variation, and
the third lens unit moves non-linearly towards the object side along the optical axis to correct image plane variation.

8. The zoom lens according to claim 1,
wherein the first lens unit includes a positive lens element G4 disposed between the positive lens element G3 and the positive lens element G5.

9. An image pickup apparatus comprising:
a zoom lens; and
an image pickup element that receives light for an image formed by the zoom lens,
wherein the zoom lens includes
a first lens unit with a positive refractive power that does not move for zooming,
a second lens unit with a negative refractive power that moves during zooming,
a third lens unit that moves during zooming, and
a fourth lens unit with a positive refractive power that does not move for zooming,
the lens units being arranged along an optical axis of the zoom lens in this order from an object plane to an image plane, the image plane being located at a surface of the image pickup element facing the zoom lens;
the first lens unit includes a negative lens element G1 having a meniscus shape with a convex surface facing towards the object plane, a positive lens element G2, a positive lens element G3, and a positive lens element G5 having a meniscus shape with a convex surface facing towards the object plane, the lens elements G1, G2 and G5 being arranged in this order from the object plane to the image plane; and
when radii of curvature of object-side and image-side lens surfaces of the negative lens element G1 are defined as G1R1 and G1R2, respectively, a focal length of the negative lens element G1 is defined as fG1, radii of curvature of object-side and image-side lens surfaces of the positive lens element G5 are defined as G5R1 and G5R2, respectively, a focal length of the positive lens element G5 is defined as fG5, and a focal length of the first lens unit is defined as f1, then the following conditional expressions are satisfied:

$$-2.2 < fG1/f1 < -1.5$$

$$1.0 < (G1R1+G1R2)/(G1R1-G1R2) < 2.0$$

$$2.4 < fG5/f1 < 3.7$$

$$-4.0 < (G5R1+G5R2)/(G5R1-G5R2) < -3.0.$$

* * * * *